US011361313B2

(12) United States Patent
Collinge et al.

(10) Patent No.: US 11,361,313 B2
(45) Date of Patent: *Jun. 14, 2022

(54) METHOD AND SYSTEM FOR GENERATING AN ADVANCED STORAGE KEY IN A MOBILE DEVICE WITHOUT SECURE ELEMENTS

(71) Applicant: MASTERCARD INTERNATIONAL INCORPORATED, Purchase, NY (US)

(72) Inventors: Mehdi Collinge, Mont-Sainte-Aldegonde (BE); Cristian Radu, Beauvechain (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 671 days.

This patent is subject to a terminal disclaimer.

(21) Appl. No.: 15/919,621

(22) Filed: Mar. 13, 2018

(65) Prior Publication Data

US 2018/0204212 A1  Jul. 19, 2018

Related U.S. Application Data

(63) Continuation of application No. 14/557,974, filed on Dec. 2, 2014, now Pat. No. 9,953,315.
(Continued)

(51) Int. Cl.
*G06Q 20/38* (2012.01)
*G06Q 20/40* (2012.01)
(Continued)

(52) U.S. Cl.
CPC ..... *G06Q 20/3829* (2013.01); *G06Q 20/3821* (2013.01); *G06Q 20/4012* (2013.01);
(Continued)

(58) Field of Classification Search
CPC ......... G06Q 20/3829; G06Q 20/32–36; G06Q 20/4012; G06Q 20/3821; H04W 12/00;
(Continued)

(56) References Cited

U.S. PATENT DOCUMENTS 5,892,900 A * 4/1999 Ginter ................... G06F 21/10
726/26
7,532,406 B2   5/2009 Hill et al.
(Continued)

FOREIGN PATENT DOCUMENTS

CN    102792325 A1   11/2012
JP    2008-527430 A    7/2008
(Continued)

OTHER PUBLICATIONS

Bruce Schneier, "Applied Cryptography", 1996, Wiley and Sons, 2nd Edition.*
(Continued)

*Primary Examiner* — Steven S Kim
(74) *Attorney, Agent, or Firm* — Buchanan Ingersoll & Rooney PC

(57) ABSTRACT

A method for building an advanced storage key includes: storing, in a mobile device, at least (i) device information associated with the mobile device, (ii) program code associated with a first program including an instance identifier, and (iii) program code associated with a second program including a first key; generating a device fingerprint associated with the mobile device based on the device information via execution of the code associated with the first program; generating a random value via execution of the code associated with the first program; building a diversifier value based on the generated device fingerprint, the generated random value, and the instance identifier included in the code associated with the first program; and decrypting the
(Continued)

built diversifier value using the first key stored in the code associated with the second program via execution of the code associated with the second program to obtain a storage key.

20 Claims, 18 Drawing Sheets

Related U.S. Application Data

(60) Provisional application No. 61/910,819, filed on Dec. 2, 2013, provisional application No. 61/951,842, filed on Mar. 12, 2014, provisional application No. 61/955,716, filed on Mar. 19, 2014, provisional application No. 61/979,132, filed on Apr. 14, 2014, provisional application No. 61/979,122, filed on Apr. 14, 2014, provisional application No. 61/979,113, filed on Apr. 14, 2014, provisional application No. 61/980,784, filed on Apr. 17, 2014, provisional application No. 61/996,665, filed on May 14, 2014.

(51) Int. Cl.
*H04L 9/40* (2022.01)
*H04W 12/041* (2021.01)

(52) U.S. Cl.
CPC .......... *H04L 63/0428* (2013.01); *H04L 63/06* (2013.01); *H04L 63/062* (2013.01); *H04W 12/041* (2021.01); *H04L 63/083* (2013.01); *H04L 2463/102* (2013.01)

(58) Field of Classification Search
CPC ............ H04W 12/04; H04W 12/0401; H04W 12/041; H04L 63/0428; H04L 63/06; H04L 63/062; H04L 2463/102
See application file for complete search history.

(56) References Cited

U.S. PATENT DOCUMENTS

| | | | |
|---|---|---|---|
| 9,083,510 B1* | 7/2015 | Lakshman | H04L 9/0863 |
| 9,288,047 B2* | 3/2016 | Brouwer | H04L 9/14 |
| 9,953,315 B2* | 4/2018 | Collinge | G06Q 20/3821 |
| 2003/0084290 A1* | 5/2003 | Murty | H04L 9/0894 713/168 |
| 2004/0030891 A1 | 2/2004 | Kurihara et al. | |
| 2005/0102503 A1* | 5/2005 | Imai | G06F 21/445 713/156 |
| 2006/0282681 A1 | 12/2006 | Scheidt et al. | |
| 2010/0174919 A1* | 7/2010 | Ito | G06F 21/554 713/192 |
| 2010/0290627 A1 | 11/2010 | Tsuji et al. | |
| 2011/0251892 A1 | 10/2011 | Laracey | |
| 2011/0270757 A1 | 11/2011 | Hammad | |
| 2012/0004217 A1 | 1/2012 | Sun et al. | |
| 2012/0042170 A1* | 2/2012 | Curtin | H04L 9/0841 713/185 |
| 2012/0074219 A1 | 3/2012 | Burdett | |
| 2012/0143752 A1 | 6/2012 | Wong et al. | |
| 2012/0317628 A1 | 12/2012 | Yeager et al. | |
| 2013/0226815 A1 | 8/2013 | Ibasco et al. | |
| 2013/0262317 A1 | 10/2013 | Collinge et al. | |
| 2013/0282502 A1 | 10/2013 | Jooste et al. | |
| 2013/0282589 A1 | 10/2013 | Shoup et al. | |
| 2013/0311781 A1 | 11/2013 | Wang et al. | |
| 2014/0003709 A1 | 1/2014 | Ranganathan et al. | |
| 2014/0025515 A1 | 1/2014 | Argue et al. | |
| 2014/0032932 A1* | 1/2014 | Hiar | G06F 12/1408 713/190 |
| 2014/0037093 A1 | 2/2014 | Park et al. | |
| 2014/0040149 A1 | 2/2014 | Fiske | |
| 2016/0119312 A1* | 4/2016 | Armstrong | H04L 9/3228 713/171 |

FOREIGN PATENT DOCUMENTS

| | | |
|---|---|---|
| JP | 2009-284231 A | 12/2009 |
| JP | 2013-529326 A | 7/2013 |
| JP | 2013-243667 A | 12/2013 |
| JP | 2013-546078 A | 12/2013 |
| KR | 10-2008-0050134 A | 6/2008 |
| WO | 2013/151797 A1 | 10/2013 |
| WO | 2015/084755 A1 | 6/2015 |

OTHER PUBLICATIONS

First Office Action dated Mar. 4, 2019, by the State Intellectual Property Office, P.R. China in corresponding Chinese Patent Application No. 201480074686.7, and an English translation of the Office Action. (13 pages).

Office Action dated Feb. 12, 2019, by the Japanese Patent Office in corresponding Japanese Patent Application No. 2017-194490. (7 pages).

Examination report No. 1 for standard patent application dated Oct. 18, 2018, by the Australian Patent Office in corresponding Australian Patent Application No. 2017245412. (6 pages).

Office Action (Notice of Non-Final Rejection) dated Nov. 15, 2019, by the Korean Intellectual Property Office in corresponding Korean Patent Application No. 10-2018-7027712 and an English Translation of the Office Action. (12 pages).

Boldyreva et al., How to Strengthen the Security of RSA-OAEP, IEEE Transactions on Information Theory (vol. 56, Issue: 11, Nov. 2010), pp. 5876-5886.

Extended European Search Report dated Oct. 5, 2017, by the European Patent Office in corresponding European Patent Application No. 14889340.7-1958. (7 pages).

Halevi et al, SecurityUnderKeyDependentInputs, ACM CCS '07: Proceedings of the 14th ACM conference on Computer and communications security, Oct. 2007.

Libert et al., Key Evolution Systems in Untrusted Update Environments, ACM ACM Transactions on Information and System Security (TI SS EC): vol. 13 Issue 4, Dec. 2010.

Notification of Transmittal of the ISR (PCT/ISA/220 & PCT/ISA/210) & the Written Opinion of the International Searching Authority (PCT/ISA/237) dated Mar. 27, 2015, in the corresponding International Application No. PCT/US2014/068000. (11 pages).

Office Action (Notice of Non-Final Rejection) dated Dec. 19, 2017, by the Korean Patent Office in corresponding Korean Patent Application No. 10-2016-7028484, and English translation of the Office Action. (11 pages).

Office Action dated Oct. 16, 2017, by the Chilean Patent Office in corresponding Chilean Patent Application No. 01866-2016, and an English translation of the Office Action. (11 pages).

Office Action dated Sep. 26, 2017, by the New Zealand Intellectual Property Office in corresponding New Zealand Patent Application No. 721223. (4 pages).

Office Action/Search Report dated Nov. 10, 2017, by the Russian Patent Office in corresponding Russian Patent Application No. 2016136503/08(057342), and English translation of the Office Action/Search Report. (13 pages).

Written Opinion issued by the Intellectual Property Office of Singapore dated Apr. 28, 2017 in corresponding Singaporean Application No. 11201604876Y (7 pages).

Zheng et al., Efficient and provably secure ciphers for storage device block level encryption, Nov. 2005 StorageSS '05: Proceedings of the 2005 ACM workshop on Storage security and survivability.

(56) References Cited

OTHER PUBLICATIONS

Notice of Allowance (Decision to Grant a Patent) dated Apr. 23, 2021, by the Japanese Patent Office in corresponding Japanese Patent Application No. 2020-004636 and an English Translation of the Notice. (5 pages).

* cited by examiner

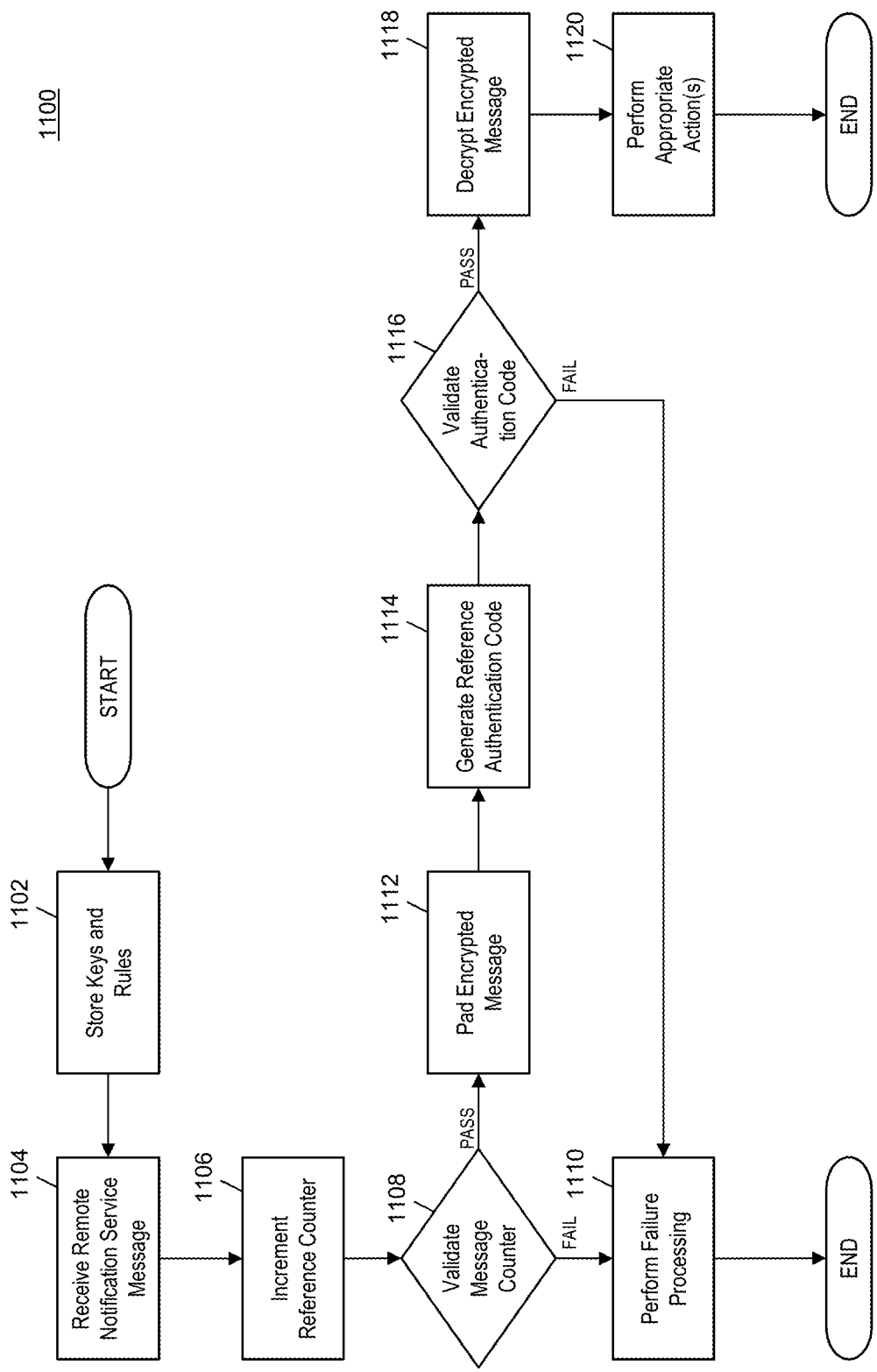

METHOD AND SYSTEM FOR GENERATING AN ADVANCED STORAGE KEY IN A MOBILE DEVICE WITHOUT SECURE ELEMENTS

RELATED APPLICATIONS

This application claims the benefit, under 35 U.S.C. 119(e), of prior-filed Provisional Patent Application Nos. 61/910,819 filed Dec. 2, 2013; 61/951,842 filed Mar. 12, 2014; 61/955,716 filed Mar. 19, 2014; 61/979,132 filed Apr. 14, 2014; and 61/980,784 filed Apr. 17, 2014; 61/979,122 filed Apr. 14, 2014; 61/996,665 filed May 14, 2014; and, in particular, Provisional Patent Application No. 61/979,113 filed Apr. 14, 2014, each herein incorporated by reference in their entirety.

FIELD

The present disclosure relates to the generation of an advanced storage key for use in a mobile device without a requiring secure element, and more specifically the use of multiple values to build an advanced storage key in a mobile device without a secure element for use in the secure storage of data in the mobile device.

BACKGROUND

Advances in mobile and communication technologies have created tremendous opportunities, one of which is providing the user of a mobile computing device with the ability to initiate and pay for payment transactions using their mobile device. One such approach to enable such actions on a mobile device has been the use of near field communication (NFC) technology to securely transmit payment details from the mobile device to a nearby contactless point of sale (POS) terminal. In order to achieve this, mobile phones with secure element hardware, such as a secure element (SE) chip, are used to securely store the payment credentials. A secure element is a special that may be included in some NFC-enabled devices that is a temper-resistant platform that may securely host applications and their confidential data.

However, not all mobile devices have secure elements. In addition, some financial institutions may not have access to secure elements on mobile devices, even if the mobile device is equipped with such an element. As a result, many consumers with mobile devices that possess the required hardware for conducting contactless or other types of remote payment transactions may be unable to actually utilize this capability. Because of such difficulties, there is a need for a technical solution to enable mobile computing devices to initiate and conduct payment transactions without the use of secure elements.

Some methods and systems for conducting payment transactions using mobile devices lacking secure elements, or without the use of secure elements in mobile devices equipped with them, can be found in U.S. patent application Ser. No. 13/827,042, entitled "Systems and Methods for Processing Mobile Payments by Provisioning Credentials to Mobile Devices Without Secure Elements," by Mehdi Collinge et al., filed on Mar. 14, 2013, which is herein incorporated by reference in its entirety. While such methods and systems can be suitable for conducting payment transactions via a mobile device without using a secure element, many consumers, merchants, and financial institutions may be wary of participating in such transactions due to a desire for even greater security.

As a result, there is a need for technical solutions to provide even more security for the receipt and storage of payment credentials in a mobile device lacking a secure element, as well as providing increased security for in the transmission of payment credentials to a point of sale from the mobile device during conducting of a financial transaction. Increased security in these processes can result in increased peace of mind for all entities involved, which can result in an increase in the use of mobile devices for contactless or remote payment transactions, which can provide a vast number of benefits to consumers over traditional payment methods.

SUMMARY

The present disclosure provides a description of systems and methods for building advanced storage keys.

A method for building an advanced storage key includes: storing, in a memory of a mobile communication device, at least (i) device information associated with the mobile communication device, (ii) program code associated with a first application program, wherein the program code includes at least an instance identifier, and (iii) program code associated with a second application program, wherein the program code includes a first key; generating, by a processing device, a device fingerprint associated with the mobile communication device based on the stored device information via execution of the program code associated with the first application program; generating, by the processing device, a random value via execution of the program code associated with the first application program; building, by the processing device, a diversifier value based on at least the generated device fingerprint, the generated random value, and the instance identifier included in the program code associated with the first application program; and decrypting, by the processing device, the built diversifier value using the first key stored in the program code associated with the second application program via execution of the program code associated with the second application program to obtain a storage key.

A system for building an advanced storage key includes a memory of a mobile communication device and a processing device. The memory of a mobile communication device is configured to store at least: device information associated with the mobile communication device; program code associated with a first application program, wherein the program code includes at least an instance identifier; and program code associated with a second application program, wherein the program code includes a first key. The processing device is configured to: generate a device fingerprint associated with the mobile communication device based on the stored device information via execution of the program code associated with the first application program; generate a random value via execution of the program code associated with the first application program; build a diversifier value based on at least the generated device fingerprint, the generated random value, and the instance identifier included in the program code associated with the first application program; and decrypt the built diversifier value using the first key stored in the program code associated with the second application program via execution of the program code associated with the second application program to obtain a storage key.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 8:
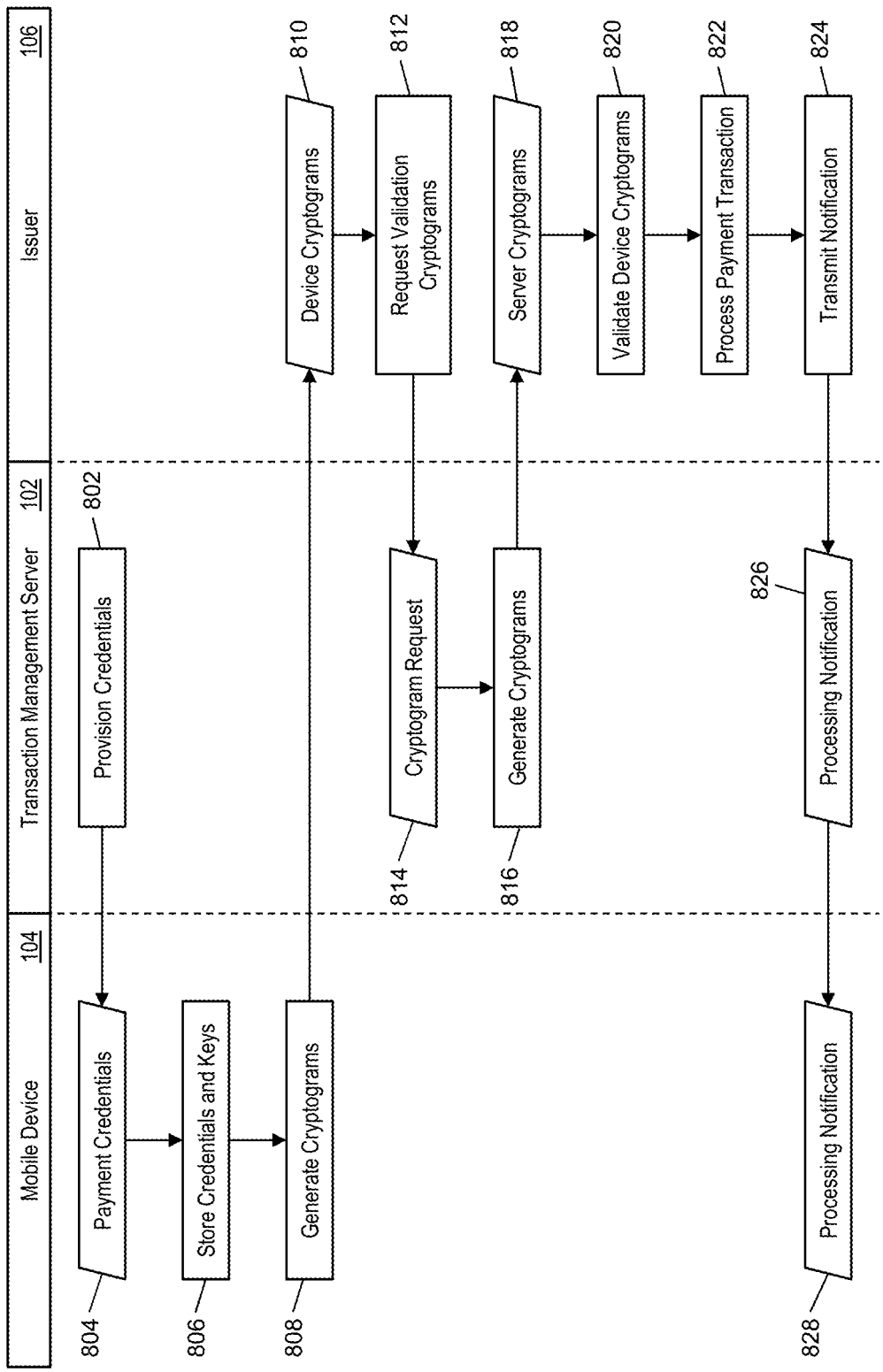
Figure 9:
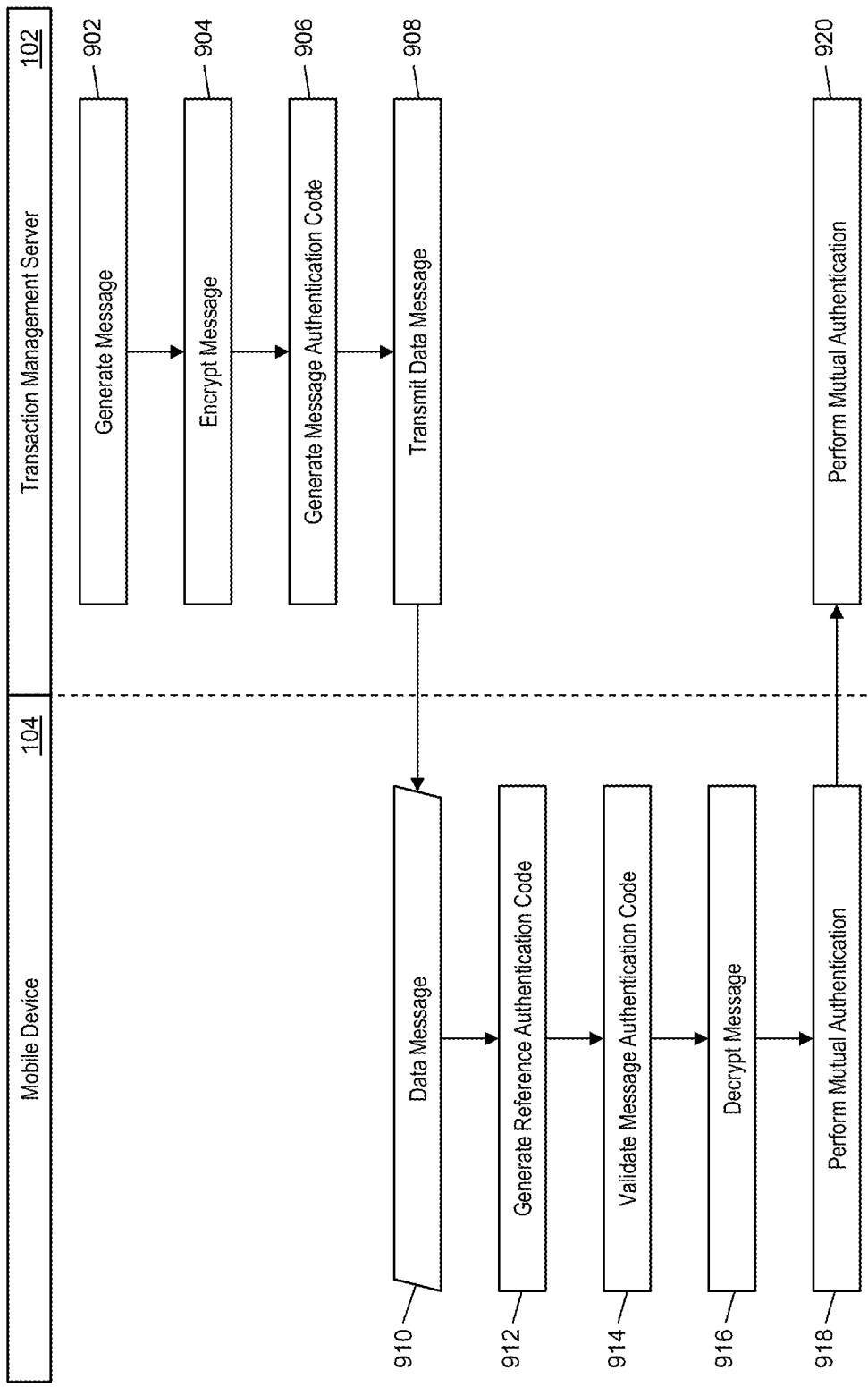

FIG. 8 is a flow diagram illustrating an alternative process for the transmitting and validation of dual application cryptograms for the processing of payment transactions involving a mobile device lacking a secure element in accordance with exemplary embodiments FIG. 9 is a flow diagram illustrating a process for creating, transmitting, and validating a remote notification service or other data message provisioned to a mobile device lacking a secure element in accordance with exemplary embodiments.

Figure 10A:
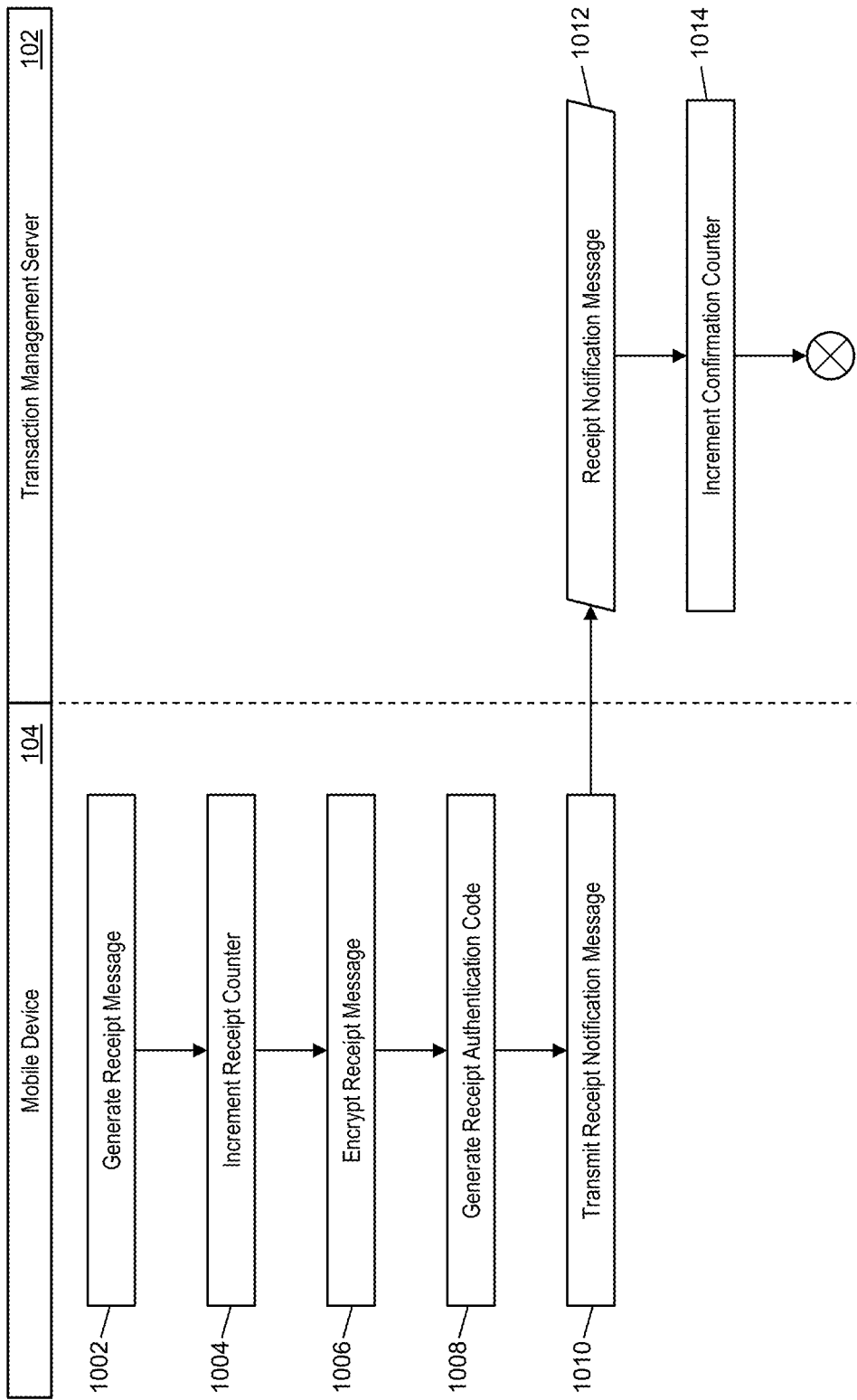
Figure 10B:
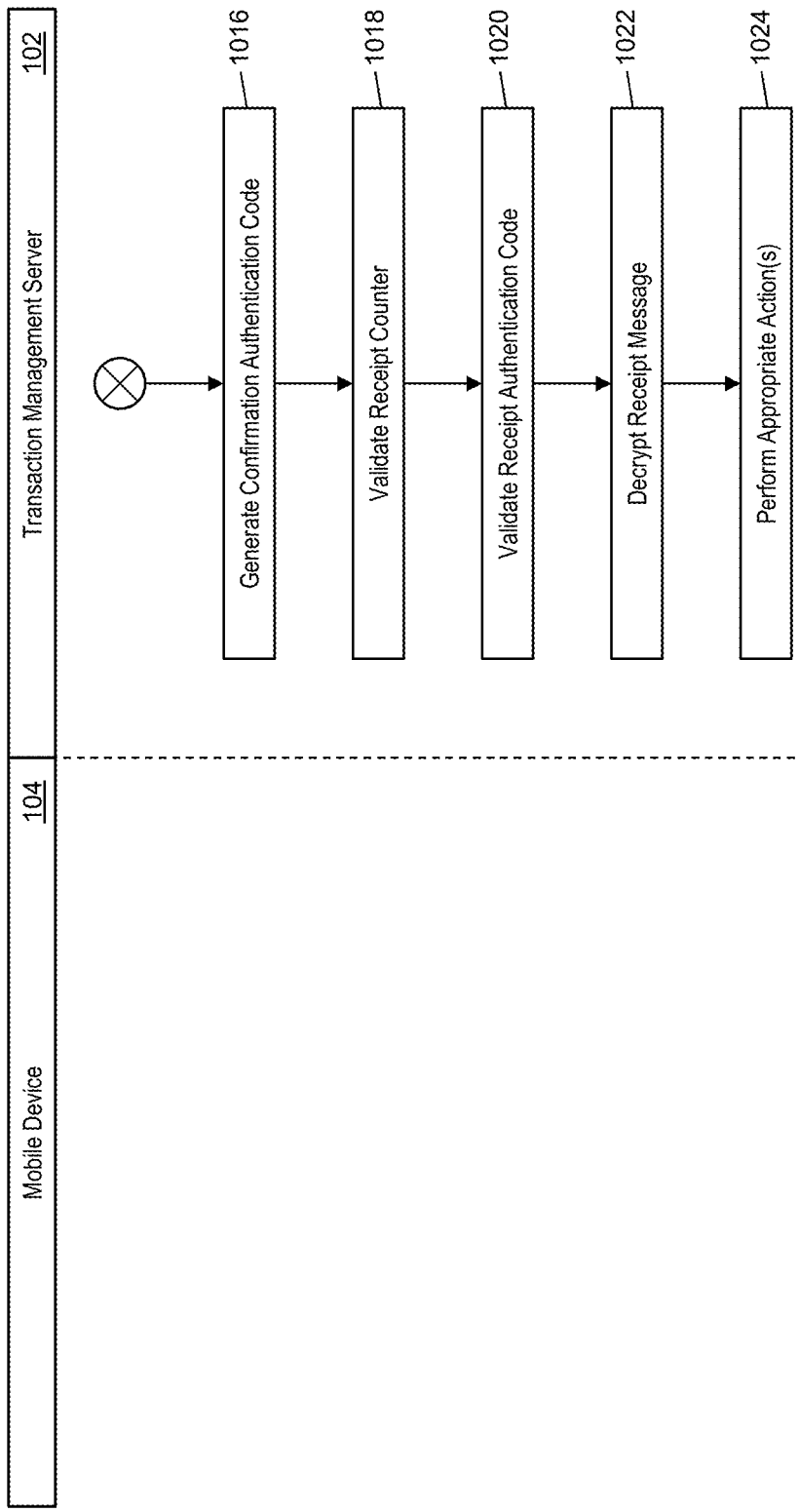

FIGS. 10A and 10B are a flow diagram illustrating a process for the creation, transmission, and validation of a message returned by a mobile device lacking a secure element in accordance with exemplary embodiments.

Figure 2:
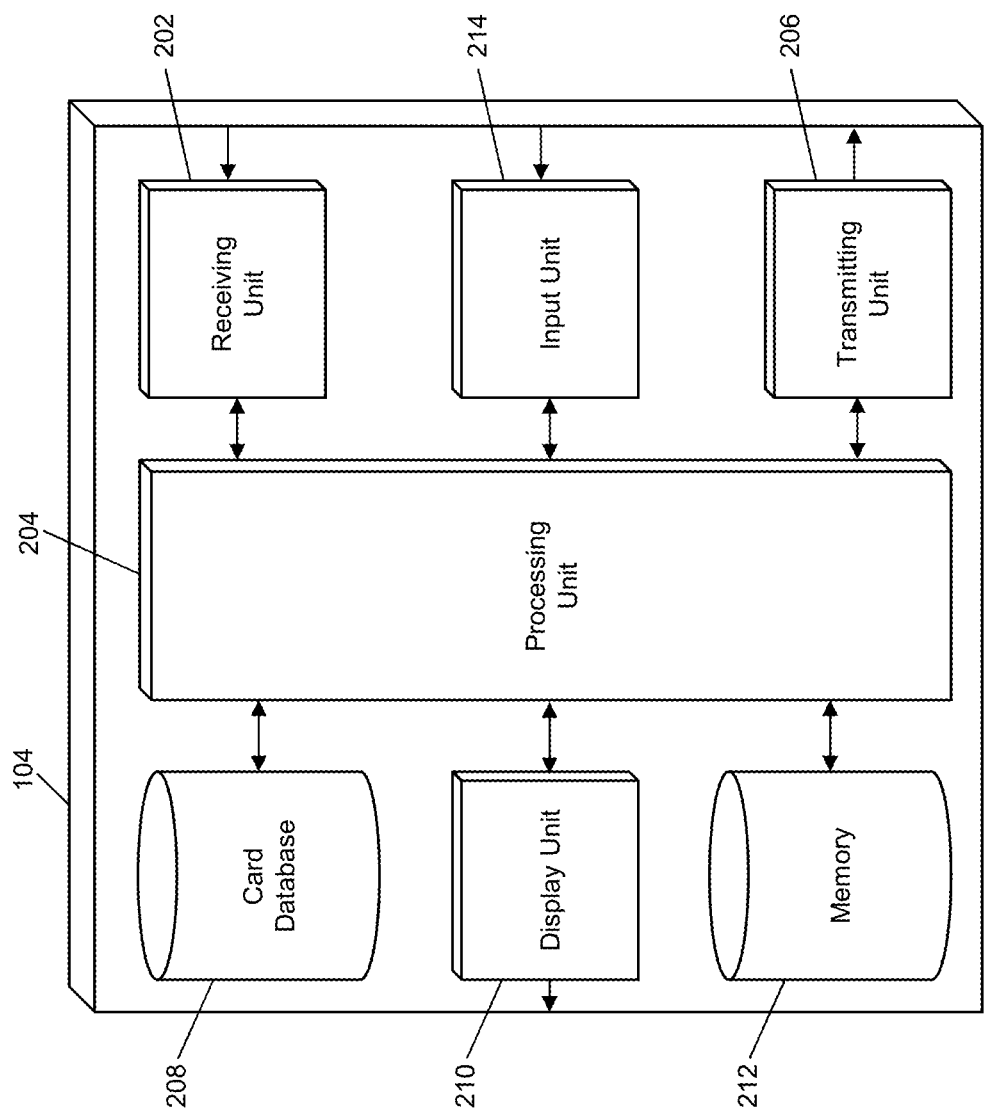
FIG. 2 is a block diagram illustrating the mobile device of FIG. 1 for the processing payment transactions without a secure element and the secure receipt and storage of payment credentials in accordance with exemplary embodiments.

FIG. 11 is a flow diagram illustrating a process for validating a remote notification service message using the mobile device of FIG. 2 in accordance with exemplary embodiments.

Figure 12:
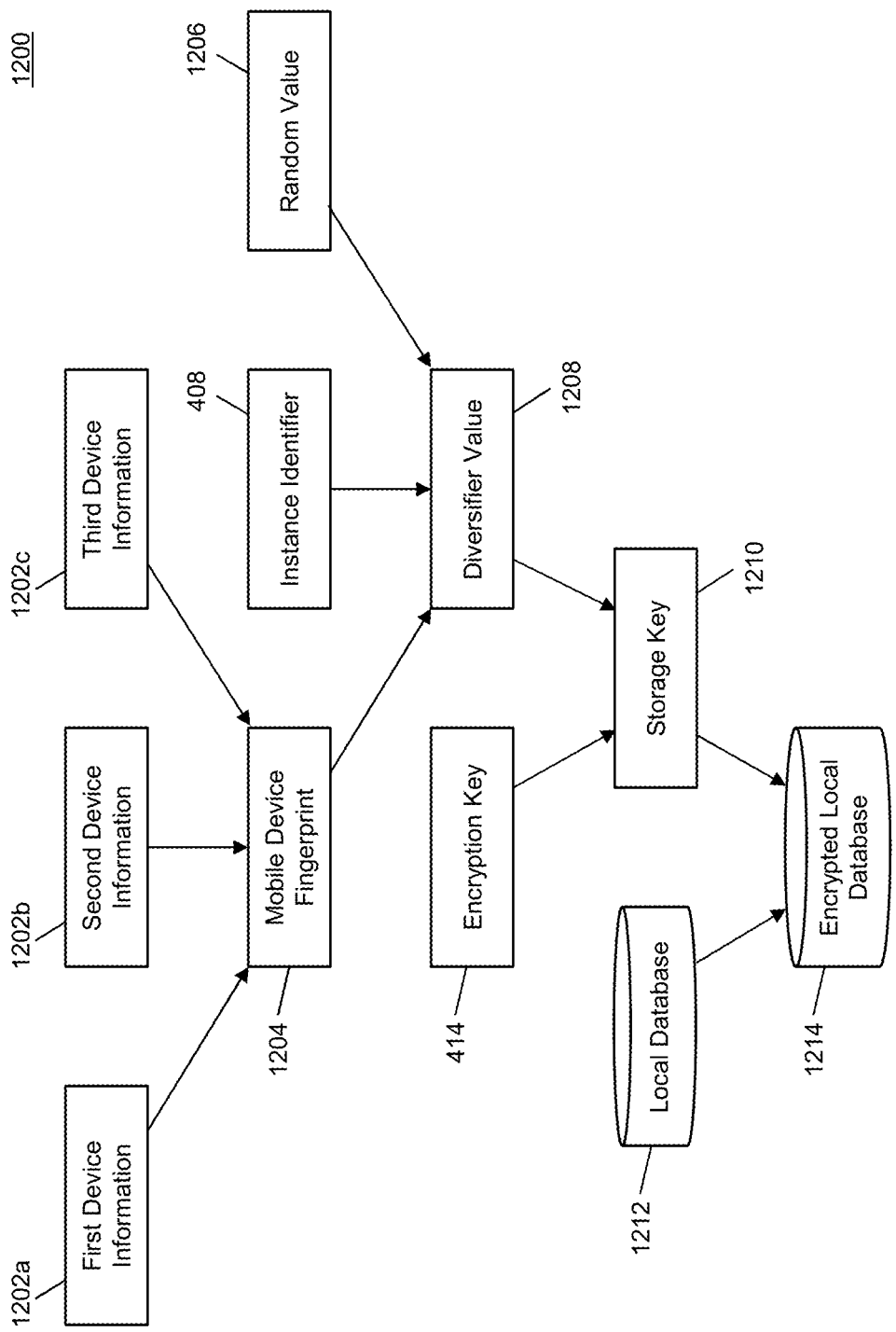

FIG. 12 is a diagram illustrating the generation of an advanced storage key using the mobile device of FIG. 2 in accordance with exemplary embodiments.

Figure 13:
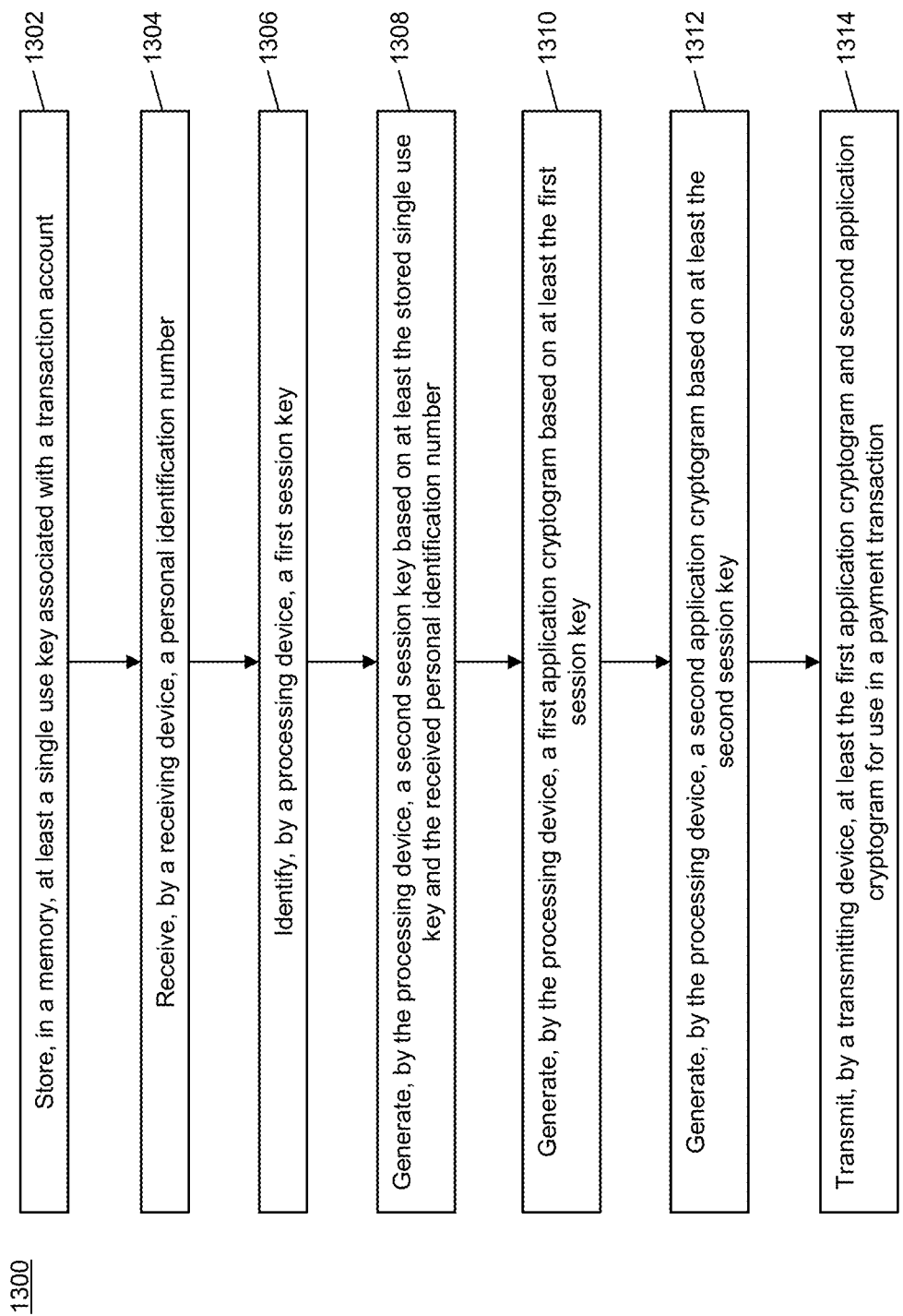
Figure 14:
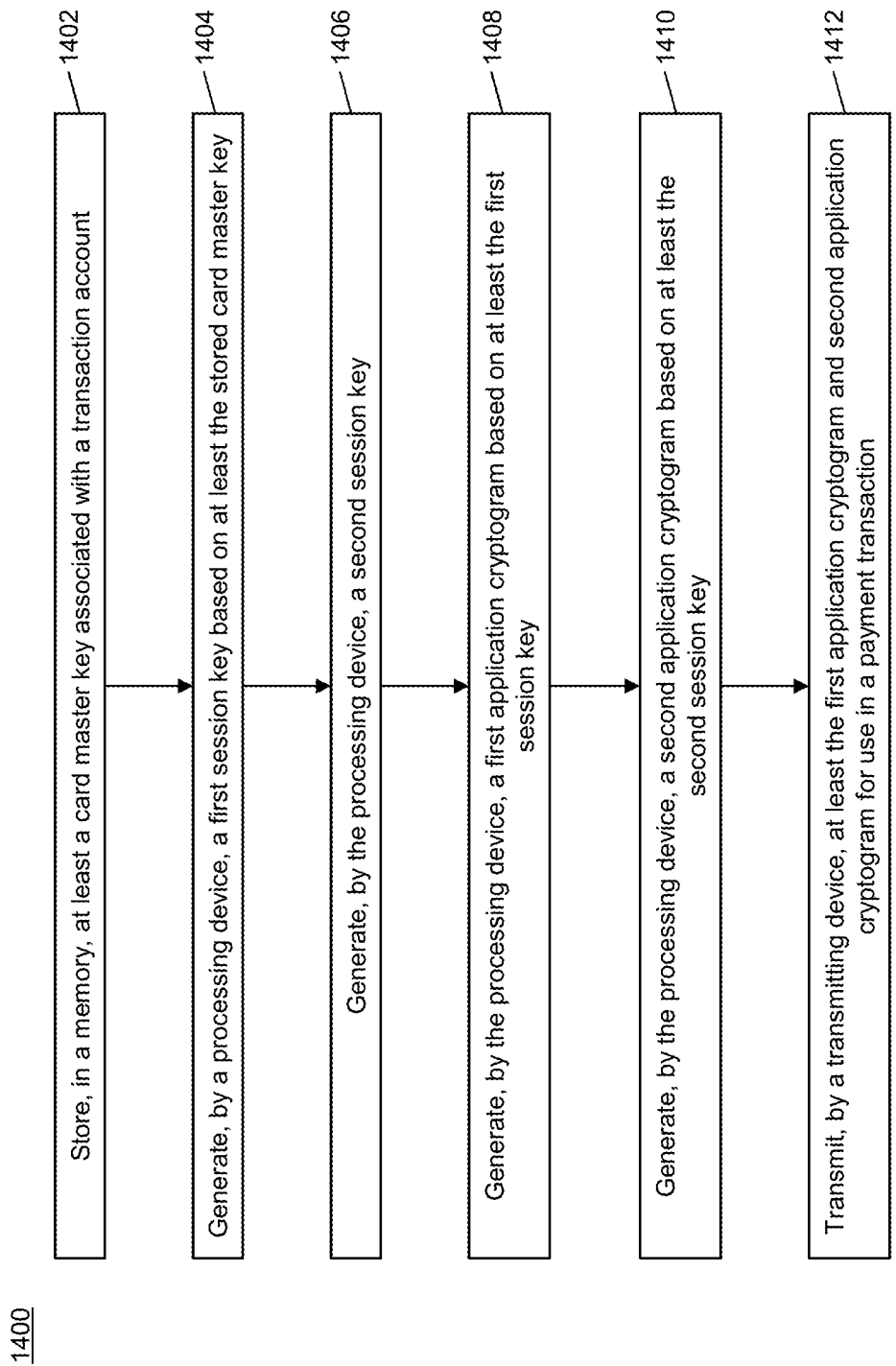

FIGS. 13 and 14 are flow charts illustrating exemplary methods for generated payment credentials in a payment transaction in accordance with exemplary embodiments.

Figure 15:
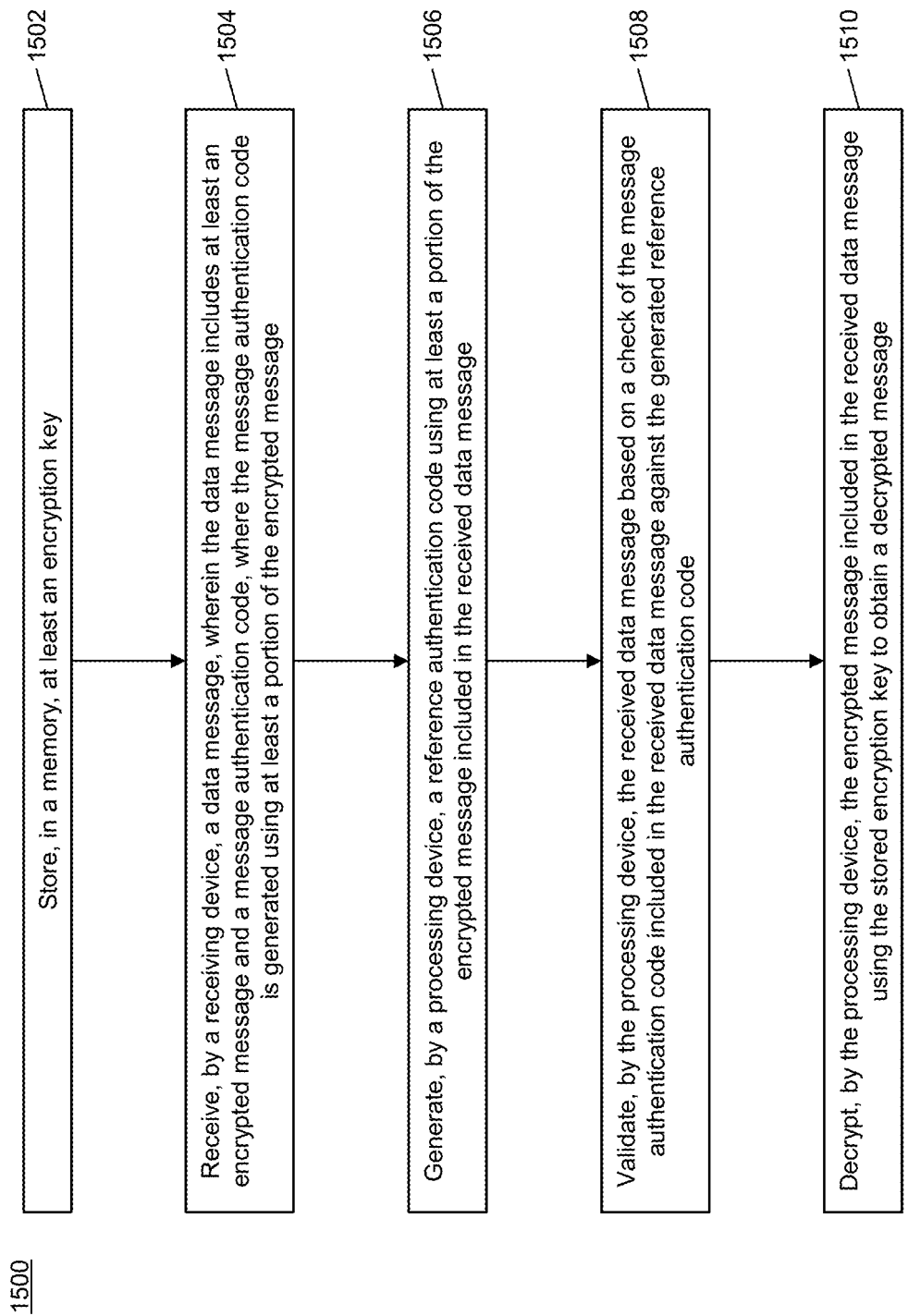

FIG. 15 is a flow chart illustrating an exemplary method for receiving and processing a remote notification service message in accordance with exemplary embodiments.

Figure 16:
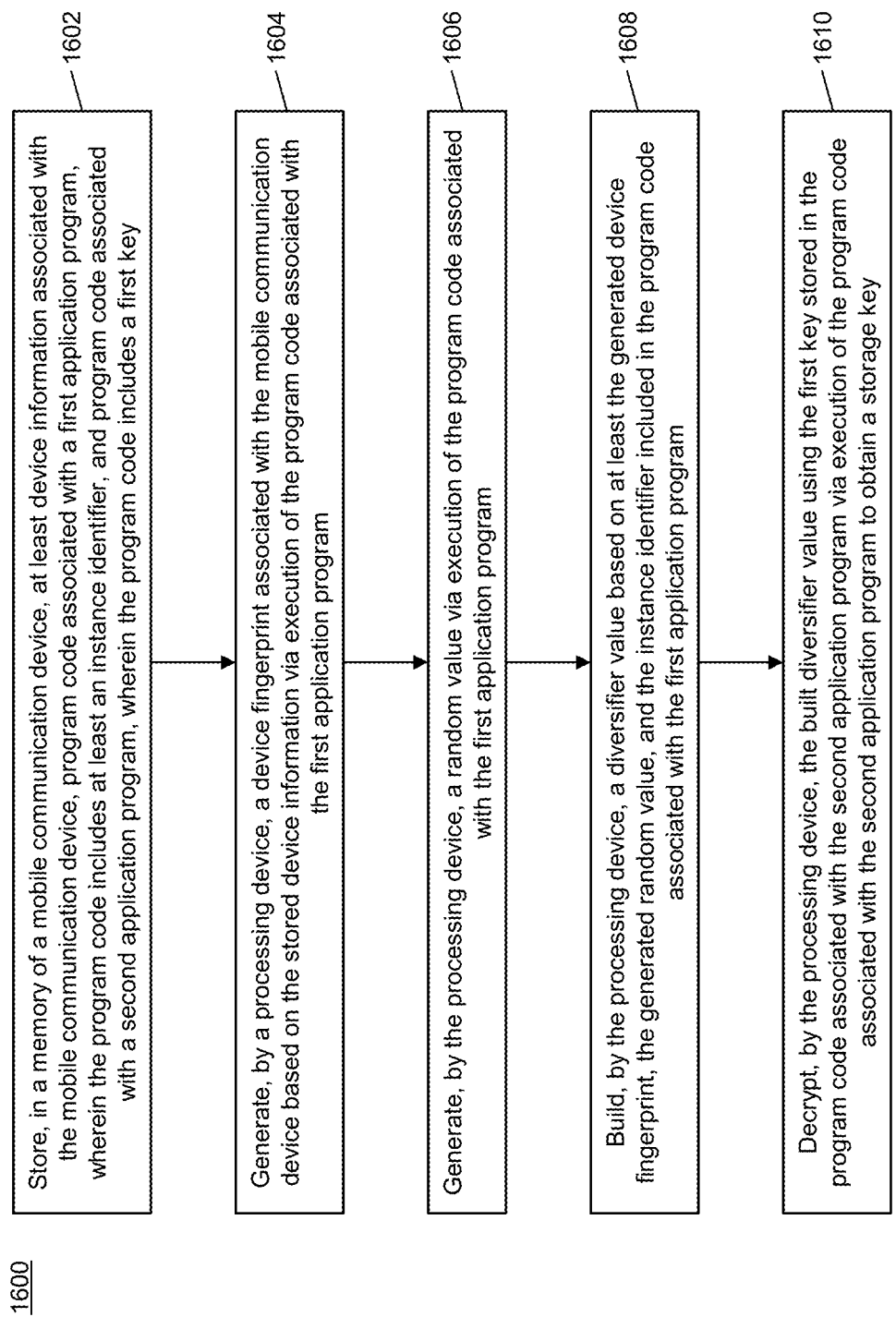

FIG. 16 is a flow chart illustrating an exemplary method for building an advanced storage key in accordance with exemplary embodiments.

Figure 17:
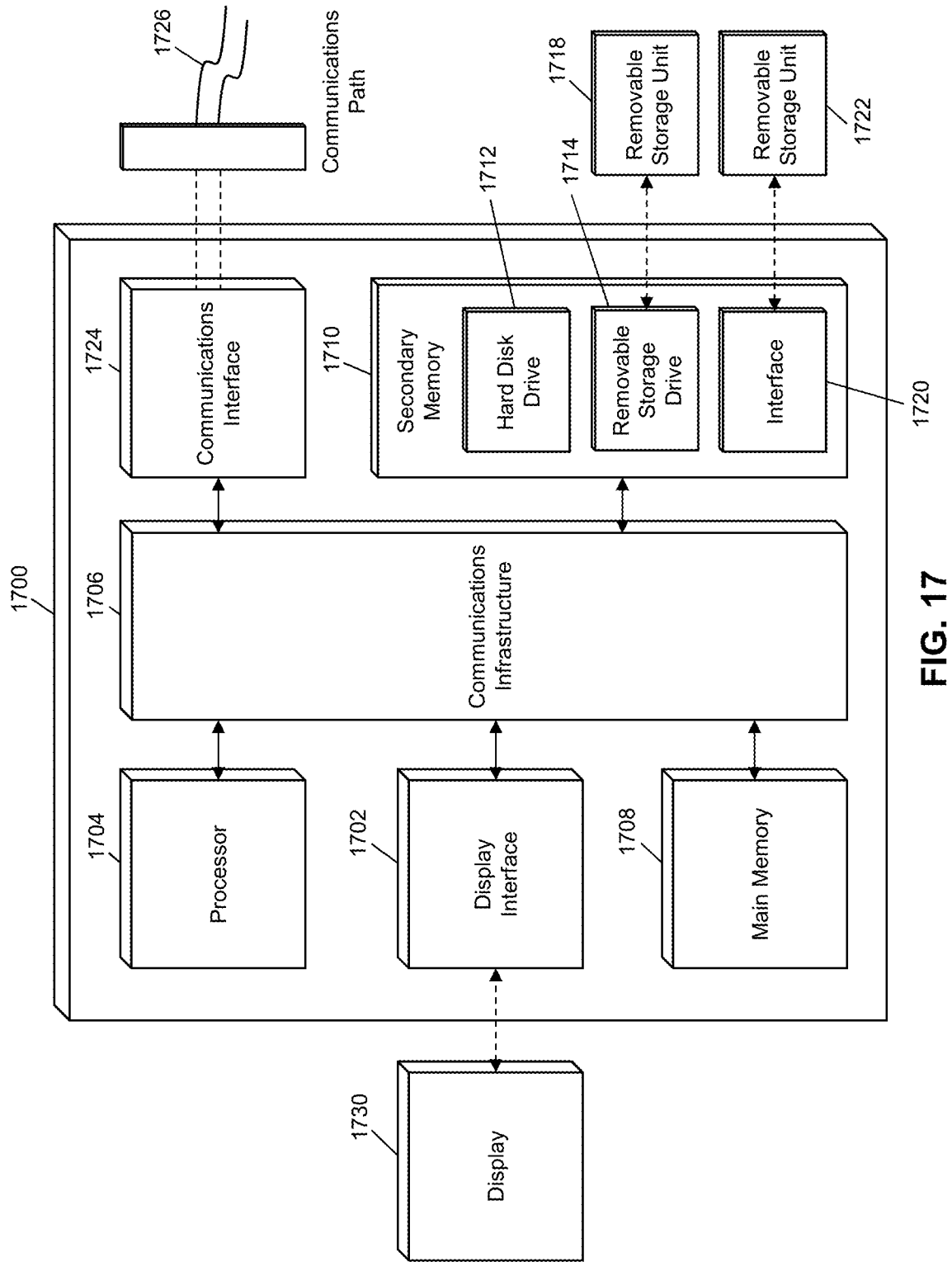

FIG. 17 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Figure 1:
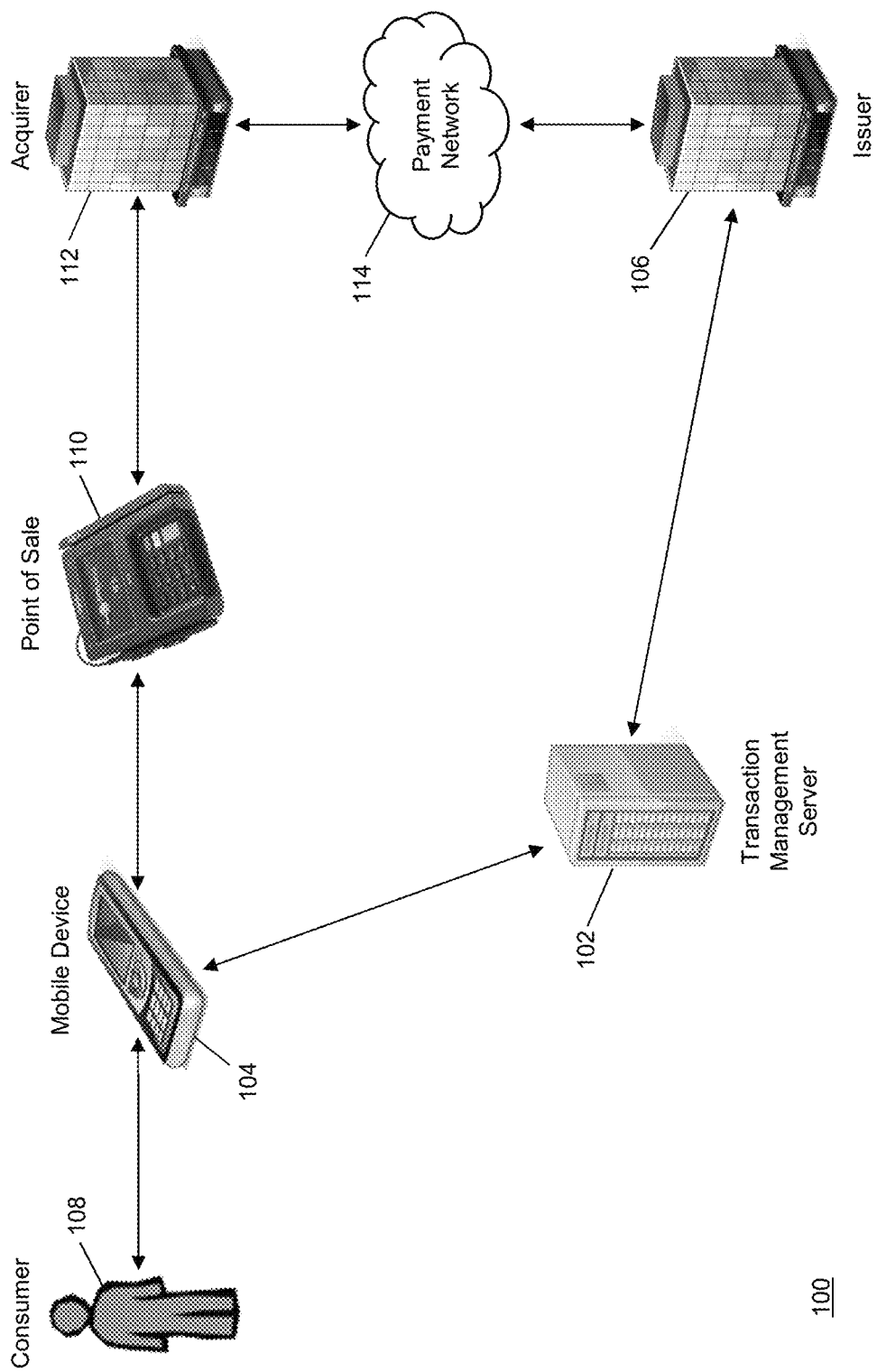
FIG. 1 is a block diagram illustrating a high level system architecture for processing payment transactions with advanced security in the provisioning and storage of payment credentials in accordance with exemplary embodiments.

System for Processing Payment Transactions Using a Mobile Device Without Secure Elements FIG. 1 illustrates a system 100 for the processing of payment transactions using a mobile device without requiring the use of secure elements, which can include the secure provisioning of payment credentials to a mobile device, secured storage thereof, and use in generating multiple application cryptograms for use in validating and processing the payment transaction.

The system 100 may include a transaction management server 102. The transaction management server 102, discussed in more detail below, may be one or more computing devices specifically programmed to perform the functions discussed herein for provisioning payment credentials to a mobile device 104 using securely transmitted remote notification message, and for validating payment credentials produced by the mobile device 104 as part of a payment transaction. While it is illustrated and discussed herein that the transaction management server 102 performs a variety of functions, it will be apparent to persons having skill in the relevant art that the transaction management server 102 may be comprised of multiple computing devices, servers, and/or computing networks configured to perform the functions discussed herein. The mobile device 104, discussed in more detail below, may be any type of mobile computing device suitable for performing the functions discussed herein, which may include a cellular phone, smart phone, smart watch, other wearable or embedded computing device, tablet computer, laptop computer etc. In some embodiments, the mobile device 104 may lack a secure element. In other embodiments, the mobile device 104 may include a secure element, but such an element may not be used in conjunction with the methods and systems discussed herein, or may be used in conjunction with the methods and systems discussed herein, such as to provide additional security.

The mobile device 104 may communicate with the transaction management server 104 using multiple communication channels, such as utilizing dual channel communication. Dual channel communication may include using two channels of communication in the transmitting and receiving of data, such as for verification and authentication, to ensure greater security in the transmission of data. The mobile device 104 may include a mobile payment application (MPA) configured to be executed by the mobile device 104 for performing the functions of the mobile device 104 discussed herein. The MPA, discussed in more detail below, may be installed on the mobile device 104 and may be activated using an activation code provided by the transaction management server 102 using methods and systems that will be apparent to persons having skill in the relevant art, such that the mobile device 104 and transaction management server 102 may securely transmit and receiving communications across one or more communication channels using shared data.

The system 100 may also include an issuer 106. The issuer 106 may be a financial institution, such as an issuing bank, that issues a payment card or payment credentials to a consumer 108 associated with a transaction account. The issuer 106 may provide payment details associated with the transaction account and/or payment card to the transaction management server 102. The payment details may include, for example, a transaction account number, account holder name, expiration date, security code, etc. The transaction management server 102 may store the data in an account database, discussed in more detail below. The transaction management server 102 may also provision the payment credentials to the mobile device 104. As used herein, the term "payment credentials" may refer to any data used by the mobile device 104 and/or transaction management server 102 in the transmission and validation of payment information used in a payment transaction using the methods and systems discussed herein, including, but not limited to, payment details, payment credentials, single use keys, session keys, application cryptograms, card master keys, etc.

In some embodiments, the payment credentials may be provisioned to the mobile device 104 via a remote notification service message. As discussed in more detail below, the remote notification service (RNS) message may be a secure message that is transmitted to the mobile device 104 and subsequently validated by the mobile device 104 such that the data contained therein may be secure from other devices and users. The MPA of the mobile device 104 may verify the authenticity of the received RNS message and may decrypt it to obtain the data included therein. The mobile device 104 may then perform any necessary functions, based on the data (e.g., such as by executing instructions included in the data), and, if applicable, may generate a return message to be sent back to the transaction management server 102. In some instances, the return message may be validated by the transaction management server 102.

In some instances, the validation of RNS messages in the mobile device 104, or the validation of return messages at the transaction management server 102, may utilize at least message counters and authentication code. The use of both counters and authentication codes may ensure that only the mobile device 104 that is intended may be able to validate and decrypt the data included in the RNS message. In addition, if the rules and/or algorithms used in the generation of the authentication code are included in the MPA, then only a mobile device 104 that also includes a specific instance of the application program may be able to validate the RNS message, resulting in additionally increased security. In instances where the RNS message may include payment credentials, this may ensure that the payment credentials are available only on the appropriate mobile device 104, and only if the MPA used to access them is a proper and authorized application.

Payment credentials provisioned to the mobile device 104 may be securely stored in storage in the mobile device 104, such as a card database, discussed in more detail below. In some embodiments, the mobile device 104 may be configured to generate an advanced storage key for use in securely storing data, such as the payment credentials, in a database or memory in the mobile device 104. The generating of an advanced storage key, as discussed in more detail below, may utilize unique device information, unique MPA information, and randomly generated information in order to identify a secure storage key that can be used to securely store data in the mobile device 104. As a result, the payment credentials or other sensitive data may be securely stored in the mobile device 104 without the use of a secure element, which can result in the mobile device 104 being capable of initiating and conducting payment transaction's without the use of a secure element, increasing availability to issuers 106 and consumers 108, while maintaining a high level of security.

Once the mobile device 104 has payment credentials for a transaction account received, validated, and stored securely therein, a consumer 108 may take the mobile device 104 to a point of sale 110 at a merchant to conduct a payment transaction. The consumer 108 may select goods or services for purchase, may initiate a payment transaction for the purchase thereof with a merchant, and may use the mobile device 104 to convey the payment credentials for use in funding the payment transaction. The conveyance of payment credentials to the point of sale 110 may include the transmission of two or more application cryptograms. The use of two or more application cryptograms may result in a higher level of security for transactions processed using the methods and systems discussed herein than is available in traditional contactless and remote transactions, including transactions conducted using a mobile device 104 having a secure element.

The application cryptograms may each be generated by the mobile device 104 using separate session keys and additional data, discussed in more detail below. The application cryptograms, generated using data stored in the mobile device 104, such as in storage secured via the advanced storage key and associated with the MPA, may ensure that the application cryptograms authenticate the mobile device 104 and the specific instance of the MPA. In some instances, one of the cryptograms and/or session keys used to generate the cryptograms may use information provided by the consumer 108, such as a personal identification number (PIN). Use of the PIN or other consumer authentication information may enable for a cryptogram to authenticate both the consumer 108 and the mobile device 104. In such an instance, the cryptograms generated by the mobile device 104 may include one that authenticates the mobile device 104, and a second that authenticates both the mobile device 104 and the consumer 108.

The cryptograms may be received by the point of sale 110 as part of the conducting of the payment transaction, such as via near field communication. The application cryptograms may accompany additional payment information, such as may be required in the context of any suitable type of payment transaction, such as a contactless transaction, a remote transaction, a secure remote payment transaction, a magnetic stripe transaction, and an M/Chip EMV transaction, and may be transmitted to the point of sale 110 using any suitable method in accordance therein as will be apparent to persons having skill in the relevant art. The cryptograms may be transmitted to an acquirer 112, which may be a financial institution, such as an acquiring bank, associated with the merchant. The acquirer 112 may, for instance, issue a transaction account to the merchant that is used to receive payment of funds from the consumer 108 for the payment transaction. The acquirer 112 may submit the cryptograms and additional transaction details to a payment network 114 using methods and systems that will be apparent to persons having skill in the relevant art. For instance, the transaction details and application cryptograms may be included in an authorization request submitted to the payment network 114 on the payment rails.

In some embodiments, both application cryptograms may be included in a single transaction message. For example, the mobile device 104 and/or point of sale 110 may include both application cryptograms in legacy data fields of a traditional transaction message in order to transmit both application cryptograms using existing payment systems and hardware. In some instances, the transaction management server 102 may be configured to use Track 2 data for validation of the application cryptograms, such as in a magnetic stripe transaction. In such instances, if the transaction message include Track 1 data, the transaction management server 102 may be configured to convert Track 1 data into Track 2 data, which may also include converting modified Track 1 or Track 2 data into unmodified (e.g., original, reconstructed, etc.) Track 1 or Track 2 data, respectively. By performing these functions, and by including the application cryptograms in legacy data fields, the transaction management server 102 may be configured to process and validate remote and contactless payment transactions using a mobile device 104 with a higher level of security, without requiring the use of a secure element on the mobile device 104, and without modification to legacy payment systems.

The payment network 114 may process the payment transaction using methods and systems that will be apparent to persons having skill in the relevant art. As part of the processing, the payment network 114 may transmit the application cryptograms to the issuer 106 for verification. In some embodiments, the verification may be performed by the payment network 114. The issuer 106 or payment network 114 may communicate with the transaction management server 102. In some embodiments, the application cryptograms may be transmitted to the transaction management server 102, and may be verified via the generation of validating application cryptograms using the transaction management server 102, which may be generated using the locally stored payment credentials. In other embodiments, the issuer 106 or payment network 114 may request application cryptograms from the transaction management server 102, which may generate them and return the cryptograms to the issuer 106 or payment network 114 for validation against the cryptograms produced by the mobile device 104.

Because the transaction management server 102 possesses the payment credentials and other data used by the mobile device 104 to generate the application cryptograms, validation of the payment credentials produced by the mobile device 104 to fund the payment transaction may be performed via comparison of the application cryptograms generated by the mobile device 104 and those generated by the transaction management server 102. In some embodiments, the transaction management server 102 may be a part of the payment network 114 or issuer 106. In instances where the transaction management server 102 may be part of the payment network 114, the validation may be performed prior to contacting the issuer 106 as part of the traditional processing of the payment transaction (e.g., for approval of funding the transaction using the consumer's 108 transaction account with the issuer 106).

By using multiple application cryptograms, the security of the payment transactions can be increased. In addition, in instances where each cryptogram may authenticate separate data, such as instances where one cryptogram authenticates the mobile device 104 and the other authenticates both the mobile device 104 and the consumer 108 (e.g., via the consumer's PIN), it may also provide the issuer 106 with additional data and considerations for use in deciding to approve or deny a transaction. For example, if both cryptograms are incorrect (e.g., the cryptograms generated by the mobile device 104 do not match those generated by the transaction management server 102), the transaction may be denied. If one cryptogram is correct and the other incorrect, the transaction may be denied for security reasons, or may be approved, such as based on a decision of the issuer 106. For example, the issuer 106 may approve a transaction where consumer authentication fails but mobile device authentication passes, as other available data may indicate that an authorized user, but not the consumer 108, is using the mobile device 104 for the transaction.

As a result, the use of both cryptograms may provide for valuable data that can be used by payment networks 114 and issuers 106 in the processing of payment transactions. In addition, the use of two or more cryptograms may provide for increased security than in traditional contactless or remote payment methods, which may result in less fraud and more acceptance for consumers 108, issuers 106, and merchants. In instances where the use of two or more application cryptograms are generated from payment credentials that have been provisioned securely using RNS messaging methods and systems discussed herein, and stored securely via advanced storage keys generated using methods and systems discussed herein, the overall security of the system 100 can be vastly increased over traditional systems for contactless payments and transaction processing. As a result, the system 100 may provide for increased security in several aspects of data transmission, storage, and processing than provided for in traditional contactless payment systems and for other types of remote payment transactions and payment transactions in general that may use the methods and systems discussed herein.

Mobile Device

FIG. 2 illustrates an embodiment of the mobile device 104 of the system 100. It will be apparent to persons having skill in the relevant art that the embodiment of the mobile device 104 illustrated in FIG. 2 is provided as illustration only and may not be exhaustive to all possible configurations of the mobile device 104 suitable for performing the functions as discussed herein. For example, the computer system 1700 illustrated in FIG. 17 and discussed in more detail below may be a suitable configuration of the mobile device 104.

The mobile device 104 may include a receiving unit 202. The receiving unit 202 may be configured to receive data over one or more networks via one or more network protocols. The receiving unit 202 may receive, for instance, program data for one or more application programs to be installed on and executed by the mobile device 104, such as a mobile payment application (MPA) discussed in more detail below. The receiving unit 202 may also receive remote notification service (RNS) messages, such as messages transmitted by the transaction management server 102 including RNS messages that include payment credentials. The receiving unit 202 may also receive additional data suitable for performing the traditional functions of a mobile device 104, such as telephone communications, cellular communications, etc. In some instances, the mobile device 104 may include a plurality of receiving units 202, such as separate receiving units 202 each configured to communicate with one or more separate networks via suitable protocols. For example, the mobile device 104 may include a first receiving unit 202 for receiving data for NFC transactions, and a second receiving unit 202 for receiving communications over a mobile communication network.

The mobile device 104 may also include an input unit 214. The input unit 214 may be configured to communicate with one or more input devices that are internally or externally connected to the mobile device 104 for receiving input from the consumer 108, such as a keyboard, mouse, click wheel, scroll wheel, touch screen, microphone, camera, receiver, etc. The input unit 214 may receive input from the consumer 108, which may be processed by a processing unit 204.

The processing unit 204 may be configured to perform the functions of the mobile device 104 discussed herein. The processing unit 204 may execute program code stored in the mobile device, such as for the MPA, and may be configured to perform a plurality of functions associated with each application program, in addition to other functions of the mobile device 104. The processing unit 204 may receive input from the consumer 108 via the input unit 214 and perform functions accordingly, such as by executing application programs, performing functions in programs, receiving data, transmitting data, displaying data, etc., as will be apparent to persons having skill in the relevant art. For example, the processing unit 204 may be configured to validate RNS messages, generate advanced storage keys, and generate application cryptograms, as discussed in more detail below.

The mobile device 104 may also include a display unit 210. The display unit 210 may be configured to communicate with one or more display devices that are internally or externally connected to the mobile device 104 for displaying data, such as data transmitted to the display unit 210 for display by the processing unit 204. Display devices may include liquid crystal displays, light-emitting diode displays, thin film transistor displays, touch screen displays, etc.

The mobile device 104 may also include a transmitting unit 206. The transmitting unit 206 may be configured to transmit data over one or more networks via one or more network protocols. The transmitting unit 206 may transmit RNS response messages to the transaction management server 102. The transmitting unit 206 may also be configured to transmit application cryptograms and/or payment credentials, such as to a point of sale 110, for use in a payment transaction. The transmitting unit 206 may be further configured to perform additional functions of the mobile device 104 as will be apparent to persons having skill in the relevant art, such as the traditional functions of a mobile communication device for transmitting cellular communications, etc. In some instances, the mobile device 104 may include a plurality of transmitting units 206, which may be separately configured to communicate with one or more separate networks, such as a transmitting unit 206 configured to transmit payment credentials and payment cryptograms via NFC and another transmitting unit 206 configured to transmit data over a mobile communication network.

The mobile device 104 may also include a card database 208. The card database 208, discussed in more detail below, may be data storage on the mobile device 104 that is configured to store data associated with one or more transaction accounts and/or payment cards. The card database 208 may store payment credentials associated with the transaction account, such as provisioned to the mobile device 104 by the transaction management server 102 in a secure RNS message, and additional data that may be used in the generation of application cryptograms, as discussed in more detail below. In some instances, the card database 208 may be stored as part of the mobile payment application.

The mobile device 104 may further include a memory 212. The memory 212, discussed in more detail below, may be configured to store data for the mobile device 104 suitable for performing the functions of the mobile device 104 discussed herein. For example, the memory 212 may store data suitable for the generation of advanced storage keys for the encrypting of additional data in the mobile device 104, such as the card database 208, as discussed in more detail below. The memory 212 may also be configured to store program code for application programs executed by the processing unit 204, such as an operating system, program code for receiving data via the input unit 214 and displaying data via the display unit 210, rules and/or algorithms for performing functions discussed herein, etc. The memory 212 may also store data suitable for performing the traditional functions of a mobile device 104, such as rules and/or algorithms for transmitting and receiving cellular communications via a mobile network. Additional data stored in the memory 212 will be apparent to persons having skill in the relevant art.

Mobile Device Card Database

Figure 3:
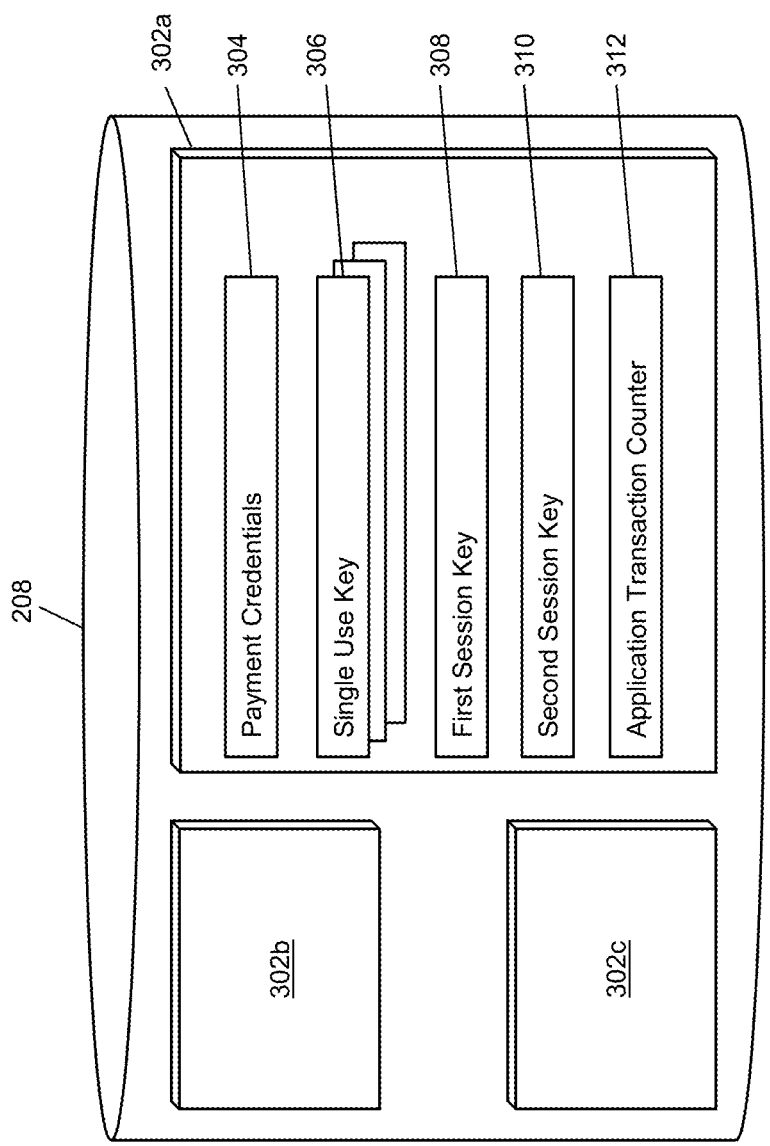
FIG. 3 is a block diagram illustrating the card database of the mobile device of FIG. 2 for storing payment credentials in accordance with exemplary embodiments.

FIG. 3 illustrates an embodiment of the card database 208 of the mobile device 104 for storing payment credentials and other data associated with transaction accounts for use in funding payment transactions conducted with the mobile device 108.

The card database 208 may include one or more payment profiles 302, illustrated in FIG. 3 as payment profiles 302*a*, 302*b*, and 302*c*. Each payment profile 302 may be associated with a transaction account that may be used to fund a payment transaction and may include at least payment credentials 304, one or more single use keys 306, a first session key 308, a second session key 310, and an application transaction counter 312.

The payment credentials 304 may include data associated with the related transaction account that is used for identification and validation by the payment network 114 and/or issuer 106 in the processing of a payment transaction using the related transaction account. The payment credentials 304 may include, for example, a transaction account number, security code, expiration date, cardholder name, authorized user name, tracking data, card layout description data, digit counts, bitmaps, etc.

Single use keys 306 may be payment tokens valid for a single payment transaction that may be used by the processing unit 204 of the mobile device 104 to generate one or more of the application cryptograms used in the payment transaction. In some embodiments, a single use key 306 may include one or more of the other data elements included in the payment profile 302. For example, each single use key 306 may include a distinct application transaction counter 312, which may not be included separately in the payment profile 302. Different configurations of the data stored in the payment profile 302 for use in performing the functions disclosed herein will be apparent to persons having skill in the relevant art. In some instances, the single use key 306 may include, or may be comprised of, a key used to generate the one or more application cryptograms. In some embodiments, the first session key 308 and second session key 310 may be included in a single use key 306 provisioned to the mobile device 104 and/or generated using data included in the single use key 306.

The first session key 308 and second session key 310 may be additional keys that are used by the processing unit 204 in the generation of the application cryptograms transmitted to the point of sale 110 as part of the conducting of a payment transaction using the mobile device 104. In some embodiments, the first session key 308 may be used in the generation of a first application cryptogram by the processing unit 204, such as using program code, rules, or algorithms stored in the memory 212 of the mobile device 104. The second session key 310 may be used in the generation of a second application cryptogram.

In some embodiments, the second session key 310 may be generated by the processing unit 204. In such an embodiment, the second session key 310 may be generated using a single use key 306 and user authentication data, such as a PIN provided by the consumer 108 (e.g., via the input unit 214). In such an embodiment, the second session key 310 may not be stored in the payment profile 302, and may instead be generated, used, and discarded as part of the payment transaction process. The second application cryptogram may therefore, when generated from the second session key 310 that is generated using the single use key 306 and the consumer PIN, serve to authenticate both the mobile device 104 and the consumer 108.

The personal identification number (PIN), may be a number supplied by the consumer 108 (e.g., during registration of the MPA on the mobile device 104 or registration of the transaction account with the issuer 106 and/or transaction management server 102) that may be used to authenticate the consumer 108. When conducting a payment transaction, the consumer 108 or other user of the mobile device 104 may supply a PIN via the input unit 214. In some embodiments, if the supplied PIN is incorrect (e.g., does not match the PIN supplied by the consumer 108 during registration), then the processing unit 204 may continue to generate the second session key 310 and subsequently generate the second application cryptogram. If the supplied PIN is incorrect, then the second application cryptogram will thereby be incorrect, which will result in a failed validation of the second application cryptogram by the transaction management server 102, issuer 106, and/or payment network 114, which may provide the issuer 106 with an opportunity to decline the transaction accordingly, or still approve the transaction.

Mobile Device Memory

Figure 4:
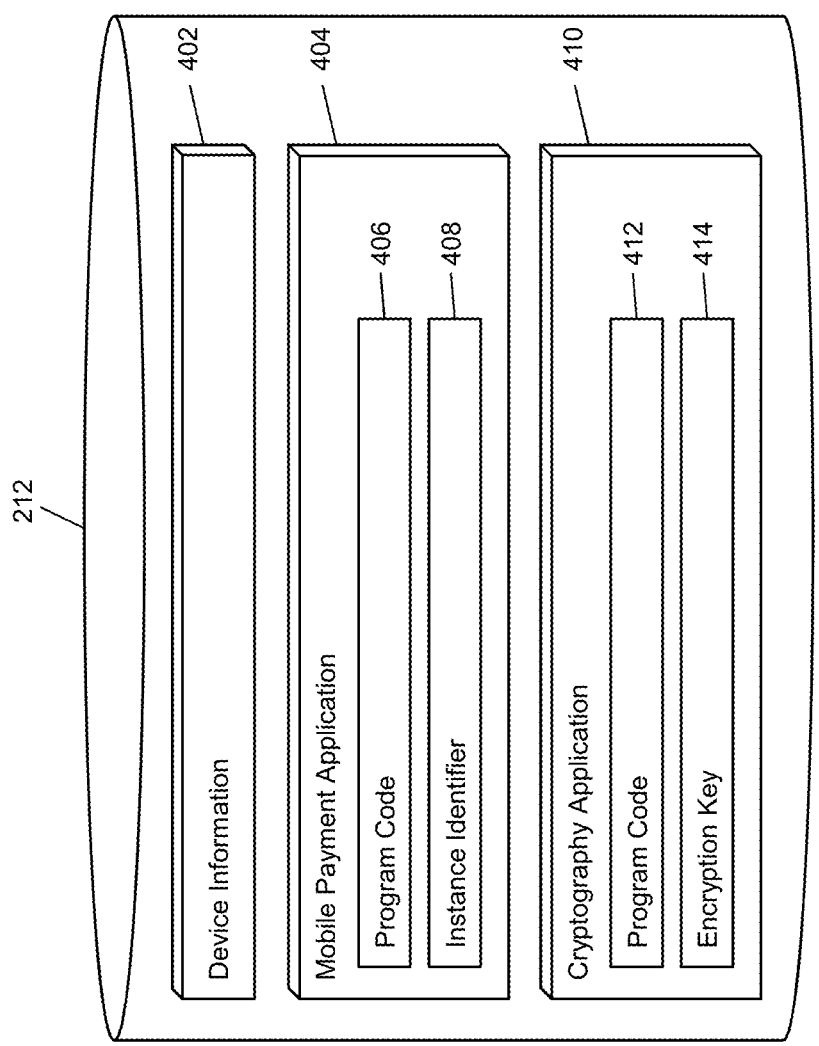
FIG. 4 is a block diagram illustrating the memory of the mobile device of FIG. 2 for storing data used in the generation of advanced storage keys and generating of application cryptograms in accordance with exemplary embodiments.

FIG. 4 illustrates an embodiment of the memory 212 of the mobile device 104 for storing application programs and other data to be used in the secured storage of data on the mobile device 104 and for the conducting of payment transactions using the mobile device 104. In an exemplary embodiment, the memory 212 may not be a secure element.

The memory 212 may include device information 402. The device information 402 may include one or more pieces of data associated with the mobile device 104 that may, in some instances, be unique to the mobile device 104. For example, the device information 402 may include a media access control address, a reference number, a serial number, an identification number, etc. Additional information that may be considered device information 402 of a mobile device 104 will be apparent to persons having skill in the relevant art.

The memory 212 may also include a mobile payment application (MPA) 404. The MPA 404 may be an application program configured to perform the functions of the mobile device 104 discussed herein, such as the receipt and storage of payment credentials, validation of RNS messages, and generation of application cryptograms for use in conducting payment transactions. Additional features of the MPA 404 may include traditional features of a digital wallet or other similar application program, as will be apparent to persons having skill in the relevant art.

The MPA 404 may include program code 406. The program code 406 may be code, executed by the processing unit 204 of the mobile device 104, that causes the processing unit 204 and other components of the mobile device 104 to perform the functions of the MPA 404 as discussed herein. For example, the program code 406 may include code suitable for generating application cryptograms, validating RNS messages, etc. The program code 406 may also include program code suitable for generating a random value, which may be used in the generation of an advanced storage key. The random value may be a random or pseudo-random number, which may be generated using methods and systems that will be apparent to persons having skill in the relevant art.

The MPA 404 may also include an instance identifier 408. The instance identifier 408 may be a value unique to the specific MPA 404, which may be used in the generation of the advanced storage key used to secure data in the mobile device 104, such as the card database 208. By having the instance identifier 408 unique to the MPA 404, multiple MPAs 404 may be installed on the mobile device 104, without any one MPA 404 being able to access data that is securely stored by any other MPA 404, which can thereby ensure that payment profiles 302 for specific transaction accounts are not accessible by other programs. The instance identifier 408 may be a number, alphanumeric value, hexadecimal value, or any suitable value that may be unique to an MPA 404.

As discussed in more detail below, the processing unit 204 of the mobile device 104 may be configured to generate a diversifier value using the device information 402, the random value generated using the program code 406 of the MPA 404, and the instance identifier 408 stored in the MPA 404. The diversifier value may be used by a cryptography application 410 also stored in the memory 212. The cryptography application 410 may be an application program configured to perform white box cryptography and/or any other suitable cryptographic function that will be apparent to persons having skill in the relevant art.

The cryptography application 410 may include program code 412. The program code 412 may be executed by the processing unit 204 of the mobile device 104 to enable the processing unit 204 and other components of the mobile device 104 to perform the cryptographic functions of the cryptography application 410 discussed herein. The functions may include the generation of an advanced storage key. The advanced storage key may be generated using the diversifier value generated by the mobile payment application 404 and an encryption key 414 included in the cryptography application 410. In some embodiments, the diversifier key may be decrypted using the encryption key 414 to obtain the advanced storage key.

The cryptography application 410 may also be configured to encrypt storage in the mobile device 104 using the advanced storage key. In some embodiments, the encryption may be performed using one or more white box cryptography techniques. The encrypted storage may be the card database 208 and/or any other suitable storage in the mobile device 104, such as data stored in the MPA 404. In some embodiments, the cryptography application 410 may be included as part of the MPA 404. The advanced storage key may be stored in the cryptography application 410 or MPA 404, or, in some instances, may be re-generated by the MPA 404 and cryptography application 410 when needed.

The memory 212 may also include any additional data stored in the mobile device 104 suitable for performing the functions discussed herein, as well as any additional functions of mobile devices. For instance, the memory 212 may include program code for an operating system, code, rules, or algorithms for receiving and transmitting mobile communications, such as telephone calls, etc.

In some embodiments, the mobile device 104 may also be configured to receive data already encrypted using the advanced storage key, which may be stored in encrypted local storage in the mobile device 104, such as in the memory 212, the card database 208, or other suitable storage. In such an embodiment, the mobile device 104 may be configured to transmit the generated random value to the transaction management server 102 or other trusted entity, which may generate the advanced storage key using the same methods and systems using the generated random value, and may encrypt data that is provisioned to the mobile device 104. The mobile device 104 may thus receive data already encrypted using the advanced storage key, for local storage in the mobile device 104.

Transaction Management Server

Figure 5:
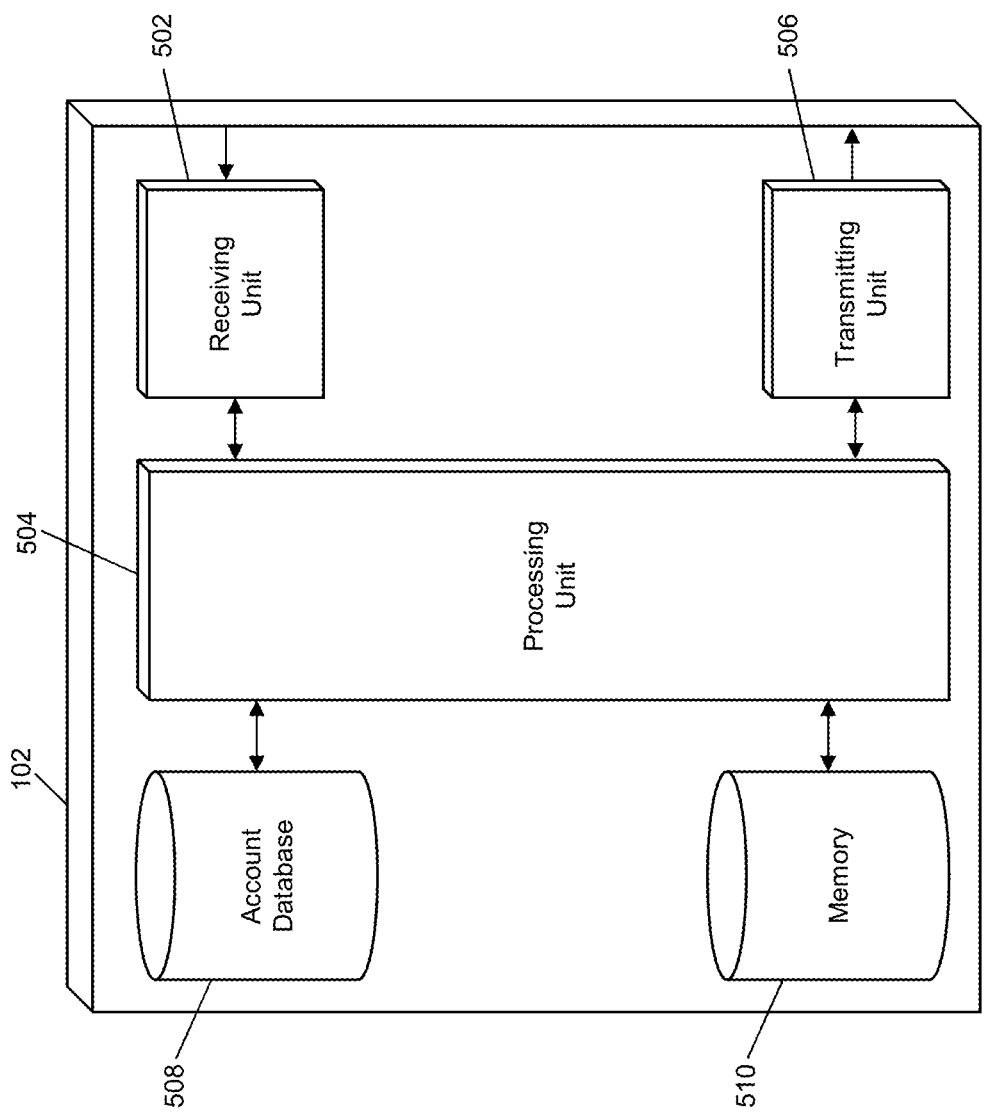
FIG. 5 is a block diagram illustrating the transaction management server of FIG. 1 for the processing of payment transactions with a mobile device without a secure element in accordance with exemplary embodiments.

FIG. 5 illustrates an embodiment of the transaction management server 102 of the system 100. It will be apparent to persons having skill in the relevant art that the embodiment of the transaction management server 102 illustrated in FIG. 5 is provided as illustration only and may not be exhaustive to all possible configurations of the transaction management server 102 suitable for performing the functions as discussed herein. For example, the computer system 1700 illustrated in FIG. 17 and discussed in more detail below may be a suitable configuration of the transaction management server 102.

The transaction management server 102 may include a receiving unit 502. The receiving unit 502 may be configured to receive data over one or more networks via one or more network protocols. The receiving unit 502 may receive data from the mobile device 104, such as receipt or return messages, confirmation messages, transaction notifications, etc., payment network 114, issuer 106, or other suitable entity. The receiving unit 502 may receive transaction notifications or cryptogram requests, such as to initiate the generation of application cryptograms for use in validation of payment credentials in a payment transaction. The receiving unit 502 may also receive transaction account data, such as from the issuer 106, for use in generating payment credentials for provisioning to the mobile device 104.

The transaction management server 102 may also include a processing unit 504. The processing unit 504 may be configured to perform the functions of the transaction management server 102 discussed herein, as will be apparent to persons having skill in the relevant art. The processing unit 504 may thus be configured to generate and encrypt RNS messages and data included therein, validate return messages from the mobile device 104, generate payment credentials, generate application cryptograms, validate application cryptograms, etc., as discussed in more detail below.

The transaction management server 102 may further include a transmitting unit 506. The transmitting unit 506 may be configured to transmit data over one or more networks via one or more network protocols. The transmitting unit 506 may transmit RNS messages, payment credentials, application cryptograms, validation notifications, and other data that will be apparent to persons having skill in the relevant art. The transmitting unit 506 may be configured to transmit data to the mobile device 104, such as via a mobile communication network or the Internet, the payment network 114, the issuer 106, and any other suitable entity.

The transaction management server 102 may also include an account database 508. The account database 508, discussed in more detail below, may be configured to store account information for a plurality of transaction accounts. The account information may include data and keys used for the generation of application cryptograms used in validation of payment credentials received during payment transactions conducted using the mobile device 104. The account database 508 may also be configured to store transaction data for payment transactions conducted involving the mobile device 104 and other data, such as data associated with the consumer 108 or other authorized users of the related transaction account.

The transaction management server 102 may also include a memory 510. The memory 510 may configured to store additional data for use by the transaction management server 102 in performing the functions disclosed herein. For example, the memory 510 may store rules or algorithms for the validation of application cryptograms, rules or algorithms for the generation of validation notifications, algorithms for the generation of session keys and application cryptograms, encryption keys for the encryption and decryption of data and RNS messages, etc. Additional data that may be stored in the memory 510 will be apparent to persons having skill in the relevant art.

Transaction Management Server Account Database

Figure 6:
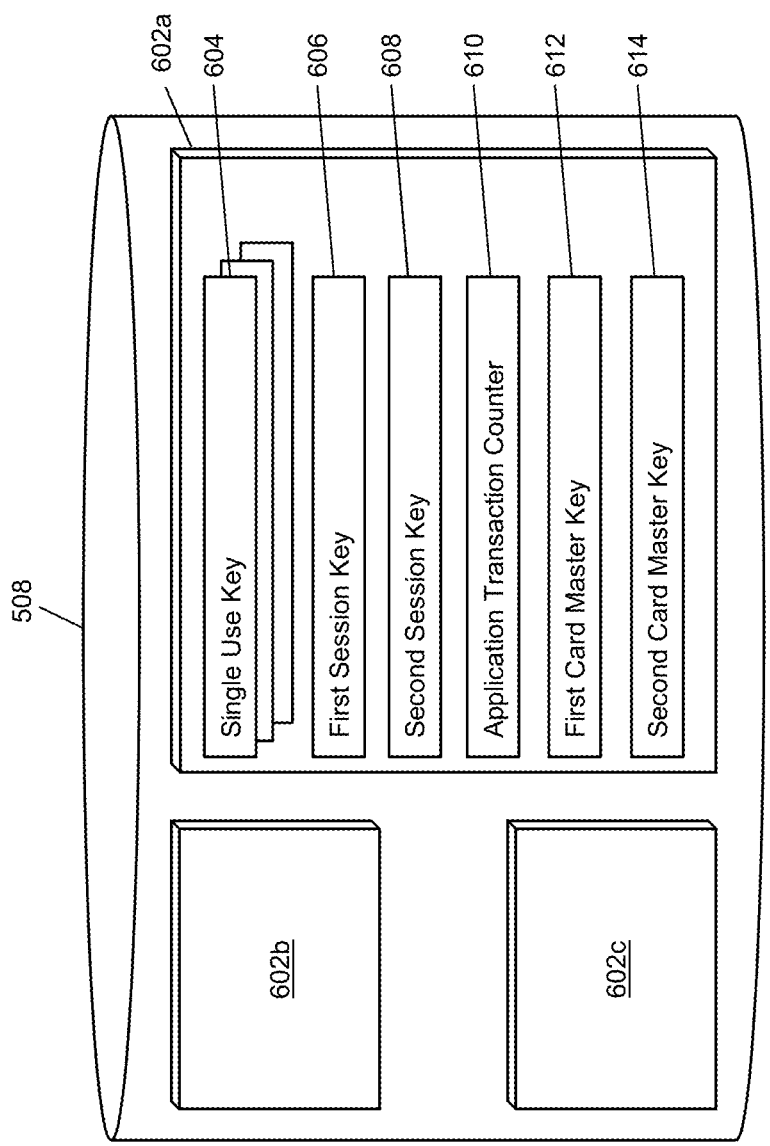
FIG. 6 is a block diagram illustrating the account database of the processing server of FIG. 5 for the storage of payment credentials and account details in accordance with exemplary embodiments.

FIG. 6 illustrates an embodiment of the account database 508 of the transaction management server 102 for storing data related to transaction accounts for use in validating payment credentials and other transaction data provided in the conducting of payment transactions including the mobile device 104.

The account database 508 may include a plurality of account profiles 602, illustrated in FIG. 6 as account profiles 602a, 602b, and 602c. Each account profile 602 may include one or more single use keys 604, a first session key 606, a second session key 608, an application transaction counter 610, and a first card master key 612. In some embodiments, an account profile 602 may further include a second card master key 612.

Each account profile 602 may correspond to a payment profile 302 provisioned to a mobile device 104. As such, the single use keys 604 stored in an account profile 602 may correspond to the single use keys 306 stored in the corresponding payment profile 302 related to the same transaction account. The data may be similar such that, when an application cryptogram is generated by the transaction management server 102 or the mobile device 104, the application cryptograms should match if the data is accurate and has not been tampered with, which may enable validation of payment credentials presented by the mobile device 104.

In some embodiments, an account profile 602 may include a personal identification number (PIN) that corresponds to the PIN 314 stored in the corresponding payment profile 302. In such an embodiment, the PIN 314 may be provided to the receiving unit 202 transaction management server 102 in a secure message, such as a receipt message provided by the mobile device 104 discussed in more detail below. In other embodiments, a card master key may be used in place of the PIN, such as the first card master key 612. In such an embodiment, the processing unit 504 of the transaction management server 102 may be configured to generate a second session key 608 based on the second card master key 614 that corresponds to the second session key 310 generated by the mobile device 104 using the single use key 306 and the PIN 314. In some instances, the second session key 608 may also be based on the corresponding single use key 604. In such embodiments, algorithms for the generation of session keys and/or application cryptograms may ensure that the cryptograms generated by the mobile device 104 and the transaction management server 102 correspond based on data used therein.

The first session key 606 may be used by the processing unit 504 of the transaction management server 102 to generate a first application cryptogram, and the second session key 608 may be used to generate a second application cryptogram. In some embodiments, the application transaction counter 610 may be used in the generation of one or more of the session keys and/or application cryptograms. The application transaction counter 610 may be a value corresponding to the payment transaction to be conducted that is incremented or otherwise modified during each transaction. The application transaction counter 610 may correspond to the application transaction counter 312 stored in the corresponding payment profile 302 in the mobile device 104, such that its use may ensure that only a valid MPA 404 may possess the correct application transaction counter 312 to generate valid session keys and/or application cryptograms. Additional techniques to further enhance the security of the session key and/or application cryptogram generation may be used, such as unpredictable numbers and other techniques that will be apparent to persons having skill in the relevant art.

Processing of Payment Transactions Using the Mobile Device

Figure 7:
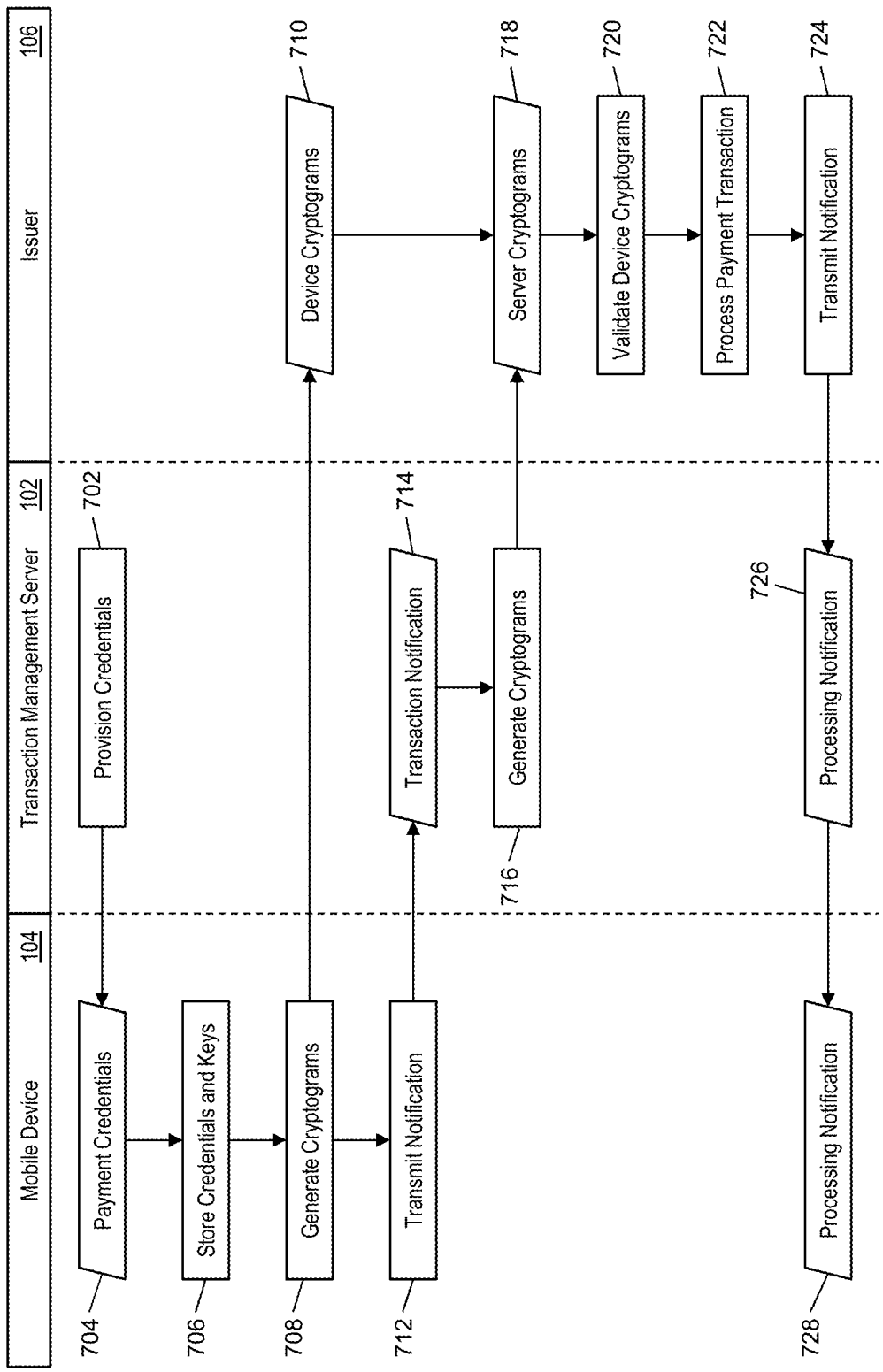
FIG. 7 is a flow diagram illustrating a process for the transmitting and validation of dual application cryptograms for the processing of payment transactions involving a mobile device lacking a secure element in accordance with exemplary embodiments.

FIG. 7 illustrates a process for the processing of payment transactions conducted using the mobile device 104 without a secure element and using the generation and validation of two or more application cryptograms.

In step 702, the transaction management server 102 may provision (e.g., via the transmitting unit 506) payment credentials 304 and other account data to the mobile device 104, such as via an RNS message discussed in more detail below. In step 704, the receiving unit 202 of the mobile device 104 may receive the payment credentials 304 and other account data. In step 706, the processing unit 204 of the mobile device 104 may store the data in a payment profile 302 in the card database 208. The account data may include the payment credentials 304, one or more single use keys 308, and any other suitable data, such as one or more of the session keys 308 and 310.

In step 708, the processing unit 204 may generate two application cryptograms for use in conducting a payment transaction. In some embodiments, step 708 may be initiated by the consumer 108, such as by indicating via the input unit 214, by placing the mobile device 104 near the point of sale 110 to initiate the transaction via near field communication, or other suitable method. Generation of the application cryptograms may include generating a first application cryptogram using the first session key 308 stored in the payment profile 302. The second application cryptogram may be generated using a second session key 310, which may be generated using a single use key 306 and a PIN 314. In some instances, the consumer 108 may enter a PIN into the mobile device 104 (e.g., via the input unit 214) prior to step 708 or during the initiation of step 708. In some embodiments, one or both of the application cryptograms may also be generated using the application transaction counter 312.

Once the application cryptograms have been generated, they, along with the payment credentials 304, may be transmitted to the issuer 106 via the point of sale 110, acquirer 112, and payment network 114. The payment credentials 304 and application cryptograms may be received by the issuer 106 in step 710. In step 712, the transmitting unit 206 of the mobile device 104 may transmit a transaction notification to the transaction management server 102. In step 714, the receiving unit 502 of the transaction management server 102 may receive the transaction notification. The transaction notification may notify the transaction management server 102 that the mobile device 104 has initiated a payment transaction using the payment profile 302. In some instances, the transaction notification may include identification information.

In step 716, the processing unit 504 of the transaction management server 102 may identify an account profile 602 corresponding to the payment profile 302 and may generate two application cryptograms using the data contained therein. The first application cryptogram may be generated using the first session key 606, which may be generated using the first card master key 612. The second application cryptogram may be generated using the second session key 608. In some embodiments, one or both of the application cryptograms and/or session keys may be further based on the single use keys 604, application transaction counter 610, or any other suitable data.

In step 718, the transmitting unit 506 of the transaction management server 102 may transmit the generated application cryptograms to the issuer 106, which may receive the cryptograms in step 718. In step 720, the issuer 106 may validate the application cryptograms provided by the mobile device 104 accompanying the payment credentials 304. Validation of the application cryptograms may include comparing the mobile device 104 supplied cryptograms with the application cryptograms generated and supplied by the transaction management server 102. Once validation is performed, then, in step 722, the issuer 106 may process the transaction accordingly. Transaction processing may include approval of the payment transaction, such as if one or both of the cryptograms are validated, or denial of the payment transaction, such as if one or both of the cryptograms are determined to be invalid.

In step 724, a transaction notification may be transmitted by the issuer 106, or other entity (e.g., the payment network 114, acquirer 112, etc.) as part of the processing of the payment transaction. The transaction notification may be transmitted to the transaction management server 102 and received by the receiving unit 502, in step 726. The transaction notification may also be received by the receiving unit 202 of the mobile device 104, in step 728. The transaction notification may be an indication of approval or denial of the payment transaction. The processing units 204 and 504 of the mobile device 104 and transaction management server 102, respectively, may each perform one or more functions as a result of the received transaction notification. For instance, if the transaction was approved and processed successfully, the application transaction counters 310 and 610 in the respective profiles may be updated accordingly.

FIG. 8 illustrates an alternative process for processing a payment transaction using the mobile device 104.

In step 802, the payment credentials 304 and other account data may be transmitted to the mobile device 104 by the transmitting unit 506 of the transaction management server 102. In step 804, the receiving unit 202 of the mobile device 104 may receive the payment credentials 304 and other account data, which may be stored in a payment profile 302 in step 806. In step 808, the processing unit 204 of the mobile device 104 may generate the two application cryptograms, as discussed above, and may transmit the cryptograms, payment credentials 304, and other suitable data to the issuer 106 (e.g., via the point of sale 110).

In step 810, the issuer 106 may receive the application cryptograms and any other suitable data that may be used by the issuer 106 to validate the transaction data and/or process approval or denial of the transaction. In step 812, the issuer 106 may submit a request for validation cryptograms to the transaction management server 102. In some embodiments, the request may include the payment credentials 304 or other data suitable for use by the transaction management server 102 in identifying the account profile 602 to be used to generate the validation cryptograms. In one embodiment, the request may further include the two application cryptograms generated by the mobile device 104 for validation.

In step 814, the receiving unit 502 of the transaction management server 102 may receive the cryptogram request. In step 816, the processing unit 504 of the transaction management server 102 may generate the two application cryptograms to be used for validation, as discussed above. In embodiments where the cryptogram request also includes the two application cryptograms generated by the mobile device 104, step 816 may also include the validation of the two cryptograms by the processing unit 504 using the two newly generated application cryptograms. The validation cryptograms, or the validation result in applicable embodiments, may be transmitted by the transmitting unit 506 to the issuer 106. In step 818, the issuer 106 may receive the validation cryptograms and/or the validation result.

In step 820, the issuer 106 may validate the application cryptograms provided by the mobile device 104 using the application cryptograms generated by the transaction management server 102. In embodiments where the transaction management server 102 provides a validation result to the issuer 106, step 820 may include identifying the result of the validation of each of the two application cryptograms. In step 822, the issuer 106 may process the payment transaction accordingly based on the result of the validation. In step 824, transaction notifications may be transmitted to the transaction management server 102 and the mobile device 104, received by the respective receiving units 502 and 202 in steps 826 and 828, respectively.

Remote Notification Service and Data Messaging

FIG. 9 illustrates a process for the transmission and validation of remote notification service (RNS) messages and other data messages transmitted from the transaction management server 102 to the mobile device 104. RNS messages may be transmitted via a remote notification service, such as one that utilizes a mobile communication network associated with the mobile device 104. RNS messages may be used to provision payment credentials 304 and other account data to the mobile device 104, such as the account data used in the processing of payment transactions, as discussed above, and other information that may be used in the establishing of a secure connection between the mobile device 104 and the transaction management server 102.

In step 902, the processing unit 504 of the transaction management server 102 may generate a message. In instances where mutual authentication is being established with the mobile device 104, the message may include information suitable for establishing the mutual authentication, such as a session identifier. In other instances, such as when mutual authentication has been established between the transaction management server 102 and mobile device 104 using the process illustrated in FIG. 9 and discussed herein, the generated message may include payment credentials 304 and account data, may include one or more commands to be executed by the MPA 404 of the mobile device 104 (e.g., the removal of single use keys 306 or payment credentials 304, etc.), may be notifications to be presented to the consumer 108 (e.g., account balances, payment notifications, etc.), or include other suitable data.

In step 904, the processing unit 504 may encrypt the generated message. The message may be encrypted using a private key of a private/public key pair, where the mobile device 104 may possess a corresponding public key. In some instances, the message may be encrypted using an encryption key associated with the mobile device 104 or the MPA 404, such as the encryption key 414. In step 906, the processing unit 504 may generate a message authentication code. The message authentication code may be generated using the encrypted message and may be a key that is generated using one or more specially configured rules and/or algorithms. For instance, the message authentication code may be generated using one or more encryption and obfuscation methods, such as padding. In some embodiments, the message authentication code may be generated using the encryption key.

In step 908, the transmitting unit 506 of the transaction management server 102 may transmit a combined data message to the mobile device 104. In embodiments where the mutual authentication may be being performed, the combined data message may be a remote notification service message transmitted to the mobile device 104 via the remote notification service. The combined data message may be received by the receiving unit 202 of the mobile device 104 in step 910, and may include the message authentication code and the encrypted message. In some instances, the combined data message may also include an additional identifier, such as one generated using methods known to the MPA 404 for verification thereof. In some cases, such as when mutual authentication has already been performed, the combined data message may also include a message counter.

In step 912, the processing unit 204 may generate a reference authentication code. The reference authentication code may be generated using the received encrypted message and may be generated using the same rules and algorithms as the transaction management server 102 used to generate the message authentication code, such that the generated reference authentication code would correspond to the message authentication code, if the message authentication code is generated by a trustworthy source (e.g., the transaction management server 102). In embodiments where the message authentication code may be generated using the encryption key, the processing unit 204 may generate the reference authentication code using the encryption key 414 stored in the memory 212 or other suitable encryption key.

In step 914, the processing unit 204 may validate the message authentication code included in the received combined data message by comparing it against the generated reference authentication code. If both the message counter and message authentication code are validated, then the combined data message may be determined to be trustworthy (e.g., genuine) as coming from the transaction management server 102. In instances where the combined data message may include a message identifier, the processing unit 204 may also validate the message identifier by generating a message identifier using a process known by the MPA 404 for generation and comparison thereof. In embodiments where the combined data message may include a message counter, the processing unit 204 may validate the message counter included in the received combined data message with a reference counter stored in the mobile device 104, such as in the MPA 404 or in a payment profile 502.

In step 916, the processing unit 204 may decrypt the encrypted message included in the received combined data message. The encrypted message may be decrypted using a key, such as one stored in the memory 212 (e.g., in the cryptography application 410 or MPA 404) or stored in a local encrypted database (e.g., encrypted using an advanced storage key), or other suitable method of decryption. In step 918, the processing unit 204 may perform one or more appropriate actions based on the data decrypted from the encrypted message. In the example illustrated in FIG. 9, the mobile device 104 may perform mutual authentication with the transaction management server 102, such as using the session identifier included in the encrypted message and decrypted by the processing unit 204. In step 920, the transaction management server 102 may receive the session identifier and perform any additional actions necessary for mutual authentication with the mobile device 104. In instances where mutual authentication has already been performed, the message may include other information suitable for performing the functions disclosed herein, such as payment credentials 404, single use keys 406, program instructions for the MPA 404, etc.

In some embodiments, the mobile device 104 may be configured (e.g., via the MPA 404) to generate and submit a return message to the transaction management server 102. In some instances, the return message may include data generated in response to the actions performed as instructed in the decrypted message, as discussed above. For example, a return message may indicate valid receipt and storage of payment credentials 304 or single use keys 306. In other instances, the return message may be a notification of receipt and validation of the combined data message. In instances where mutual authentication is first being performed, the return message may include the session identifier used to perform the mutual authentication.

FIGS. 10A and 10B illustrate a process for the generation and transmission of a return message by the mobile device 104 and validation thereof by the transaction management server 102.

In step 1002, the processing unit 204 of the mobile device 104 may generate a receipt message. The receipt message may be generated based on program code 406 stored in the MPA 404, and may be further based on actions performed as indicated in a decrypted combined data message received from the transaction management server 102. For instance, the receipt message may include a notification of successful receipt and storage of payment credentials 304. In step 1004, the processing unit 204 may increment a receipt counter. The receipt counter may be a counter indicative of the number of receipt messages transmitted to the transaction management server 102. The receipt counter may be stored in the memory 212, such as in the MPA 404, or in a database encrypted using the advanced storage key. It will be apparent to persons having skill in the relevant art that step 1004 may be an optional step, and may only be used in instances where a counter is used for validation of a data message.

In step 1006, the processing unit 204 may encrypt the receipt message. The receipt message may be encrypted using the encryption key 414 stored in the cryptography application 410, or may be otherwise stored in the MPA 404 or a locally encrypted database. The encryption key used to encrypt the receipt message may be a private key as part of a key pair, with the transaction management server 102 possessing a corresponding public key. In step 1008, the processing unit 204 may generate a receipt authentication code based on the encrypted receipt message. In some embodiments, the receipt authentication code may be generated using the same rules, algorithms, and/or processes as used to generate the reference authentication code illustrated in step 912 of FIG. 9, discussed above.

In step 1010, the transmitting unit 206 of the mobile device 104 may transmit a receipt notification message to the transaction management server 102. The receipt notification message may be received by the receiving unit 502 of the transaction management server 102 and may include at least the receipt authentication code, the encrypted receipt message, and the receipt counter. In some embodiments, the receipt notification message may be transmitted to the transaction management server 102 using a mobile communication network, such as a cellular network, associated with the mobile device 104.

In step 1014, the processing unit 504 of the transaction management server 102 may increment a confirmation counter. The confirmation counter may be indicative of the number of messages received from the mobile device 104, used for validation of messages received from the mobile device 104. The confirmation counter may be stored in the memory 510 of the transaction management server 102 or other suitable data storage. For instance, in some embodiments, the confirmation counter may be stored in an account profile 602 associated with the mobile device 104. In one example, each account profile 602 may include a confirmation counter (e.g., and/or a message counter) to be used for messages transmitted to/from the transaction management server 102 and mobile device 104 related to the corresponding transaction account. It will be apparent to persons having skill in the relevant art that step 1014 may be an optional step and may not be performed in instances where a counter may not be used for validation of return messages.

In step 1016, the processing unit 504 may generate a confirmation authentication code. The confirmation authentication code may be generated based on the encrypted receipt message included in the receipt notification message, and may be generated using the same rules, algorithms, and/or processes used to generate the message authentication code. In step 1018, the processing unit 504 may validate the receipt counter included in the receipt notification message by comparing it to the confirmation counter. In step 1020, the processing unit 504 may validate the receipt authentication code by comparing it to the message authentication code, to ensure that the message originated from an authorized mobile device 104.

Once the counter (e.g., if applicable) and authentication code have been validated, then, in step 1022, the processing unit 504 may decrypt the encrypted message included in the received receipt notification message. The encrypted message may be decrypted using a stored encryption key or other suitable method of decryption. The encrypted message may be decrypted to obtain the receipt message generated by the mobile device 104. In step 1024, the processing unit 504 may perform any appropriate actions as necessary based on the data included in the receipt message. For example, if the receipt message includes an indication of successful receipt and storage of single use keys 306, the processing unit 204 may activate corresponding single use keys 604 in a corresponding account profile 602.

Validation of Data Messages

FIG. 11 illustrates a process 1100 for the validation of data messages received by the mobile device 104 from the transaction management server 102.

In step 1102, the processing unit 204 of the mobile device 104 may store encryption keys, authentication generation keys, and rules and/or algorithms for the use and application thereof in local storage, such as the memory 212 or locally encrypted storage encrypted using an advanced storage key. In step 1104, the receiving unit 202 of the mobile device 104 may receive a data message from the transaction management server 102. In some embodiments, the data message may be received from the transaction management server 102 following the establishing of mutual authentication between the two devices, such as using the process illustrated in FIG. 9 and discussed above. The data message may include at least a message counter, a message authentication code, and an encrypted message.

In step 1106, the processing unit 204 may increment a reference counter. The reference counter may be stored in the memory 212 or other local storage, and may be used to indicate the number of messages received from the transaction management server 102. In some instances, the reference counter may be incremented using an algorithm, such that the reference counter may not be incremented using consecutive numbers, but via an algorithm known to the mobile device 104 (e.g., via the MPA 404) and the transaction management server 102.

In step 1108, the processing unit 204 may validate the message counter included in the received data message. Validation of the message counter may include comparison of the message counter to the value of reference counter after being incremented. Failed validation may indicate that the source of the data message is not the transaction management server 102 or is otherwise not trustworthy. If the validation fails, then, in step 1110, the processing unit 204 may perform one or more appropriate actions associated with a failed data message receipt and/or validation. For example, the processing unit 204 may discard the data message, may notify the transaction management server 102, may lock the associated payment profile 302, or other action that will be apparent to persons having skill in the relevant art.

If the validation of the message counter passes, then the process 1100 may proceed to step 1112, where the encrypted message may be padded. Padding of the encrypted message may include the addition of values to the encrypted message or data associated thereof. Padding may be used to heighten the security of the message validation process, as it may be another function that must be performed by the mobile device 104 and transaction management server 102 known to each other that would need to be replicated by an unauthorized entity in order to transmit or receive a data message successfully without authorization. It will be apparent to persons having skill in the relevant art that step 1112 may be an optional step. In some embodiments, step 1112 may be applied in some instances of the process 1110. For example, the encrypted message may be padded at certain increments of the reference counter.

In step 1114, the processing unit 204 may generate a reference authentication code. The reference authentication code may be generated based on the encrypted message (e.g., as padded, if applicable) using one or more rules or algorithms, such as stored in step 1102. In some embodiments, the reference authentication code may be a key or may be a value generated by application of a key to the encrypted message. In step 1116, the processing unit 204 may validate the message authentication code received in the RNS message. Validation of the message authentication code may include comparison of the code to the generated reference authentication code, as another method of identification if the received data message originated from an authorized source (e.g., the transaction management server 102).

If the validation of the message authentication code fails, the process 1100 may proceed to step 1110 where the failure processing is performed. If the validation of the message authentication code passes, then, in step 1118, the encrypted message included in the received data message may be decrypted by the processing unit 204. The message may be decrypted using one or more encryption/decryption keys, rules, and/or algorithms, such as stored in the mobile device 104 in step 1102. For example, the encryption key 414 stored in the cryptography application 410 of the memory 212 may be used to decrypt the encrypted message. In step 1120, the processing unit 204 may perform one or more actions as appropriate based on the content of the decrypted message. For example, if the decrypted message includes single use keys 306, the single use keys 306 may be stored in the appropriate payment profile 302 of the card database 208, which may thereby be encrypted using the advanced storage key.

Advanced Storage Key

FIG. 12 illustrates the generation and use of the advanced storage key by the mobile device 104 for the secure storage of data in the mobile device 104, such as payment profiles 302 and other data that may be securely stored and accessed in the mobile device 104 without the use of secure elements.

The device information 402 stored in the memory 212 of the mobile device 104 may include three or more pieces of device information 1202, illustrated in FIG. 12 as device information 1202a, 1202b, and 1202c. Each piece of device information 1202 may be associated with the mobile device 104. In some instances, each piece of device information 1202 may be unique to the mobile device 104. In other instances, one or more of the pieces of device information 1202 may not be unique to the mobile device 104 (e.g., a model number), but the three pieces of device information 1202 when taken together may be unique to the mobile device 104 (e.g., a unique combination). The pieces of device information 1202 may be data that will not change during the lifespan of the mobile device 104.

The processing unit 204 of the mobile device 104 may generate a mobile device fingerprint 1204 based on the three pieces of device information 1202a, 1202b, and 1202c. The mobile device fingerprint 1204 may be a value unique to the mobile device 104, and may be generated using one or more rules or algorithms stored in the memory 212, such as included in the program code 406 of the MPA 404. The mobile device fingerprint 1204 may be, for example, a numerical value, a hexadecimal value, a character string, etc.

The processing unit 204 may also be configured to generate a diversifier value 1208 using the mobile device fingerprint 1204. The diversifier value may be generated by combining the mobile device fingerprint 1204 with the instance identifier 408 of the MPA 404 as well as a random value 1206. The random value 1206 may be a random or pseudo-random number generated by the processing unit 204. In some instances, the random value 1206 may be generated pursuant to one or more rules or algorithms stored in the memory 212. The combination of the mobile device fingerprint 1204, instance identifier 408, and random value 1206 may also be performed using one or more rules or algorithms, such as stored in the program code 406 of the MPA 404. Use of the instance identifier 408 to generate the diversifier value may result in the ability to securely store data associated with an instance of the MPA 404 such that multiple installations of the MPA 404 may be unable to access data stored by other instances of the MPA 404.

The processing unit 204 may then generate an advanced storage key 1210 via application of the encryption key 414 stored in the cryptography application 410 to the diversifier value 1208. In some instances, the advanced storage key 1210 may be generated by decryption of the diversifier value 1208 using the encryption key 414. In other instances, the advanced storage key 1210 may be a value resultant from the encryption of the diversifier value 1208 using the encryption key 414. In some embodiments, the advanced storage key 1210 may be generated as the result of performing white box cryptography using the encryption key 414 and the diversifier value 1208.

Once the advanced storage key 1210 has been generated, the processing unit 204 may use the advanced storage key 1210 to encrypt a local database 1210. The local database 1210 may be comprised of, for example, the card database 208, one or more payment profiles 302, part of the memory 212, or other suitable data source. In some instances, the local database 1210 may be a part of another database in the mobile device 104, such as the card database 208. For example, the card database 208 may include a plurality of local databases 1212, such as a separate local database 1212 for each instance of the MPA 404 for storing payment profiles 302 associated thereof. The resulting encrypted local database 1214 may thereby securely store data that is inaccessible by any other application program internal or external the mobile device 104 except the specific instance of the MPA 404 that includes the instance identifier 408. Accordingly, the encrypted local database 1214 may be ideal to store payment credentials 304, single use keys 306, and other account data, and may provide for secure storage of sensitive account information without the use of secure elements.

In some embodiments, the storage key may also be used by the transaction management server 102 to provide encrypted data to the mobile device 104 for storage in the encrypted local database 1214. For example, the transmitting unit 206 of the mobile device 104 may transmit the generated random value 1206 to the transaction management server 102. In some instances, the instance identifier 408 may also be transmitted to the transaction management server 102, or it may be previously possessed by the transaction management server 102, such as during registration of the MPA 404. The transaction management server 102 may then generate the advanced storage key 1210 itself, encrypt data to be provisioned to the mobile device 104, such as payment credentials 304, single use keys 306, etc. using the advanced storage key 1210, and then transmit the encrypted data to the mobile device 104. The mobile device 104 may then store the already encrypted data in the encrypted local database 1214.

First Exemplary Method for Generating Payment Credentials in a Payment Transaction FIG. 13 illustrates a method 1300 for the generating of payment credentials in a payment transaction, including the use of two application cryptograms for the secure use of payment credentials in a mobile device 104 without a secure element.

In step 1302, at least a single use key (e.g., single use key 306) may be stored in a memory (e.g., a payment profile 302) associated with a transaction account. In some embodiments, the memory 302 may be a non-Secure Element memory in a mobile communication device (e.g., the mobile device 104). In step 1304, a personal identification number (PIN) may be received by a receiving device (e.g., the receiving unit 202 and/or input unit 214).

In step 1306, a first session key (e.g., first session key 308) may be identified by a processing device (e.g., the processing unit 204). In step 1308, a second session key (e.g., second session key 310) may be generated by the processing device 204 based on at least the stored single use key 306 and the received PIN.

In step 1310, a first application cryptogram may be generated by the processing device 204 based on at least the first session key 308. In step 1312, a second application cryptogram may be generated by the processing device 204 based on at least the second session key 310.

In step 1314, at least the first application cryptogram and the second application cryptogram may be transmitted by a transmitting device (e.g., the transmitting unit 206) for use in a payment transaction. In some embodiments, the first application cryptogram and the second application cryptogram may be transmitted to a point of sale device (e.g., the point of sale 110). In one embodiment, the method 1300 may further include storing, in the memory 302, a card master key associated with the transaction account, wherein identifying the first session key 308 includes generating, by the processing device 204, the first session key 308 based on at least the stored card master key.

In some embodiments, the method 1300 may also include storing, in the memory 302, an application transaction counter (e.g., the application transaction counter 312), wherein identifying the first session key 308 includes generating, by the processing device 204, the first session key 308 based on at least the stored application transaction counter 312. In one embodiment, the method 1300 may further include validating, by the processing device 204, the received PIN prior to generating the second session key 310. In a further embodiment, the processing device 204 may be configured to generate an invalid second session key 310 if validation of the received PIN fails.

Second Exemplary Method for Generating Payment Credentials in a Payment Transaction FIG. 14 illustrates a method 1400 for the generating of payment credentials in a payment transaction, including the use of two application cryptograms validation of payment credentials generated by a mobile device 104 without the use of a secure element.

In step 1402, at least a card master key (e.g., first card master key 612) may be stored in a memory (e.g., account profile 602) associated with a transaction account. In step 1404, a first session key (e.g., first session key 606) may be generated by a processing device (e.g., the processing device 504) based on at least the stored card master key 612. In step 1406, a second session key (e.g., second session key 608) may be generated by the processing device 504.

In step 1408, a first application cryptogram may be generated by the processing device 504 based on at least the first session key 606. In step 1410, a second application cryptogram may be generated by the processing device 504 based on at least the second session key 608. In step 1412, at least the first application cryptogram and the second application cryptogram may be transmitted by a transmitting device (e.g., the transmitting unit 506) for use in a payment transaction.

In one embodiment, the method 1400 may further include storing, in the memory 602, a transaction account sequence number associated with the transaction account, wherein the first session key is further based on the stored transaction account sequence number. In some embodiments, the method 1400 may also include storing, in the memory 602, a second card master key (e.g., the second card master key 614) associated with the transaction account, wherein the second session key 608 is based on at least the stored second card master key 614.

In one embodiment, the method 1400 may further include: receiving, by a receiving device (e.g., the receiving unit 502), a first corresponding application cryptogram and a second corresponding application cryptogram; validating, by the processing device, (i) the received first corresponding application cryptogram based on the generated first application cryptogram, and (ii) the received second corresponding application cryptogram based on the generated second application cryptogram; and transmitting, by the transmitting device 506, a result of the validation for use in the payment transaction. In a further embodiment, the first corresponding application cryptogram and the second corresponding application cryptogram may be received from a point of sale device (e.g., the point of sale 110). In another further embodiment, the result of the validation may be transmitted to a financial institution (e.g., the issuer 106) associated with the transaction account.

Exemplary Method for Processing a Data Message

FIG. 15 illustrates a method 1500 for processing a data message, such as a remote notification message received via a remote notification service, including the receipt and validation thereof by a mobile device 104 without using a secure element.

In step 1502, at least an encryption key may be stored in a memory (e.g., the memory 212). In some embodiments, the memory 212 may be non-Secure Element memory in a mobile communication device (e.g., the mobile device 104). In step 1504, a data message may be received by a receiving device (e.g., the receiving unit 202), wherein the data message may include at least an encrypted message and a message authentication code, where the message authentication code is generated using at least a portion of the encrypted message. In some embodiments, the data message may be an remote notification service message received via a remote notification service.

In step 1506, a reference authentication code may be generated by a processing device (e.g., the processing unit 204) using at least a portion of the encrypted message included in the received data message. In one embodiment, the memory 212 may further include one or more authentication code generation rules, and the reference authentication code may be generated based on application of the stored one or more authentication code generation rules to the portion of the encryption message included in the received data message. In step 1508, the received data message may be validated by the processing device 204 based on a check of the message authentication code included in the received data message against the generated reference authentication code. In some embodiments, the memory may further include a reference counter, the received data message may further include a message counter, and the received data message may be further validated by the processing device 204 based on a check of the message counter included in the received data message against the stored reference counter.

In step 1510, the encrypted message included in the data message may be decrypted by the processing device 204 using the stored encryption key to obtain a decrypted message. In one embodiment, the decrypted message may include at least one of: a digitized card profile (e.g., payment credentials 304) and a single use key (e.g., the single use key 306) for use in a payment transaction. In some embodiments, the method 1500 may also include checking, by the processing device 204, a data format of the decrypted message based on one or more data formatting rules.

In one embodiment, the method 1500 may further include transmitting, by a transmitting device (e.g., the transmitting unit 206), a receipt notification in response to the received data message. In a further embodiment, the method 1500 may even further include: performing, by the processing device 204, one or more actions based on the decrypted message; generating, by the processing device 204, a return message as a result of or based on the performed one or more actions; encrypting, by the processing device 204, the generated return message using the stored encryption key to obtain an encrypted return message; and generating, by the processing device 204, a return authentication code using at least a portion of the encrypted return message, wherein the transmitted receipt notification includes the encrypted return message, and the return authentication code. In an even further embodiment, the memory 212 may further include a return counter, and the transmitted receipt notification may further include the return counter.

In some embodiments, the method 1500 may also include padding, by the processing device 204, the encrypted message included in the received data message using a padding key, wherein the portion of the encrypted message used to generate the reference authentication code is the padded encrypted message. In a further embodiment, the padding key may be the encryption key. In another further embodiment, the memory 212 may further include an authentication code padding algorithm, and padding the encrypted message using the padding key may include padding the encrypted message based on application of the padding key to the authentication code padding algorithm.

Exemplary Method for Building an Advanced Storage Key

FIG. 16 illustrates a method 600 for building an advanced storage key for the secure encryption and storage of local data in a mobile device 104 without using a secure element.

In step 1602, at least device information (e.g., device information 402) associated with a mobile communication device (e.g., the mobile device 104), program code (e.g., program code 406) associated with a first application program (e.g., the mobile payment application 404), and program code (e.g., program code 412) associated with a second application program (e.g., the cryptography application 410) may be stored in a memory (e.g., the memory 212) of the mobile communication device 104, wherein the program code 406 associated with the first application program 404 includes at least an instance identifier (e.g., instance identifier 408) and the program code 412 associated with the second application program 410 includes at least a first key (e.g., the encryption key 414).

In some embodiments, the device information 402 may include one or more unique identifier associated with the mobile communication device 104. In one embodiment, the instance identifier 408 may be unique to an instance of the first application program 404. In some embodiments, the second application program 410 may be configured to perform white box cryptography using the first key. In one embodiment, the first key may be a dynamic key. In some embodiments, the program code 412 associated with the second application program 410 may be included in the program code 406 associated with the first application program 404. In further embodiments, the second application program 410 may be an executable function of the first application program 404.

In step 1604, a device fingerprint (e.g., mobile device fingerprint 1204) associated with the mobile communication device 104 may be generated by a processing device (e.g., the processing unit 204) based on the stored device information 402 via execution of the program code 406 associated with the first application program 404. In step 1606, a random value (e.g., random value 1206) may be generated by the processing device 204 via execution of the program code 406 associated with the first application program 404. In some embodiments, the random value 1206 may be a random or pseudo-random number.

In step 1608, a diversifier value (e.g., diversifier value 1208) may be built by the processing device 204 based on at least the generated device fingerprint 1204, the generated random value 1206, and the instance identifier 408 included in the program code 406 associated with the first application program 404. In step 1610, the built diversifier value 1208 may be decrypted by the processing device 204 using the first key stored in the program code 412 associated with the second application program 410 via execution of the program code 412 associated with the second application program 410 to obtain a storage key (e.g., advanced storage key 1210).

In some embodiments, the method 1600 may further include: storing, in a local database (e.g., the local database 1212) of the mobile communication device 104, protected data; and encrypting, by the processing device 204, the protected data stored in the local database 1212 using the storage key 1210. In one embodiment, the method 1600 may also include: storing, in the memory 212, program data associated with the first application program 404; and storing, in the program data associated with the first application program 404, the generated random value 1206.

In one embodiment, the method 1600 may also include: transmitting, by a transmitting device (e.g., the transmitting unit 206) at least the random value 1206; receiving, by a receiving device (e.g., the receiving unit 202), one or more encrypted parameters, wherein the one or more encrypted parameters are each encrypted using the storage key 1210; and storing, in a local database 1212 of the mobile communication device 104, the received one or more encrypted parameters. In a further embodiment, the storage key 1210 may be transmitted to a third party (e.g., the transaction management server 102) and the one or more encrypted parameters may be received from the third party 102. In some further embodiments, the instance identifier 408 may also be transmitted by the transmitting device 206.

Computer System Architecture

FIG. 17 illustrates a computer system 1700 in which embodiments of the present disclosure, or portions thereof, may be implemented as computer-readable code. For example, the transaction management server 102 and mobile device 104 of FIG. 1 may be implemented in the computer system 1700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 7, 8, 9A, 9B, 10A, 10B, 11, and 13-16.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1718, a removable storage unit 1722, and a hard disk installed in hard disk drive 1712.

Various embodiments of the present disclosure are described in terms of this example computer system 1700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1704 may be a special purpose or a general purpose processor device. The processor device 1704 may be connected to a communications infrastructure 1706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1700 may also include a main memory 1708 (e.g., random access memory, read-only memory, etc.), and may also include a secondary memory 1710. The secondary memory 1710 may include the hard disk drive 1712 and a removable storage drive 1714, such as a floppy disk drive, a magnetic tape drive, an optical disk drive, a flash memory, etc.

The removable storage drive 1714 may read from and/or write to the removable storage unit 1718 in a well-known manner. The removable storage unit 1718 may include a removable storage media that may be read by and written to by the removable storage drive 1714. For example, if the removable storage drive 1714 is a floppy disk drive or universal serial bus port, the removable storage unit 1718 may be a floppy disk or portable flash drive, respectively. In one embodiment, the removable storage unit 1718 may be non-transitory computer readable recording media.

In some embodiments, the secondary memory 1710 may include alternative means for allowing computer programs or other instructions to be loaded into the computer system 1700, for example, the removable storage unit 1722 and an interface 1720. Examples of such means may include a program cartridge and cartridge interface (e.g., as found in video game systems), a removable memory chip (e.g., EEPROM, PROM, etc.) and associated socket, and other removable storage units 1722 and interfaces 1720 as will be apparent to persons having skill in the relevant art.

Data stored in the computer system 1700 (e.g., in the main memory 1708 and/or the secondary memory 1710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1700 may also include a communications interface 1724. The communications interface 1724 may be configured to allow software and data to be transferred between the computer system 1700 and external devices. Exemplary communications interfaces 1724 may include a modem, a network interface (e.g., an Ethernet card), a communications port, a PCMCIA slot and card, etc. Software and data transferred via the communications interface 1724 may be in the form of signals, which may be electronic, electromagnetic, optical, or other signals as will be apparent to persons having skill in the relevant art. The signals may travel via a communications path 1726, which may be configured to carry the signals and may be implemented using wire, cable, fiber optics, a phone line, a cellular phone link, a radio frequency link, etc.

The computer system 1700 may further include a display interface 1702. The display interface 1702 may be configured to allow data to be transferred between the computer system 1700 and external display 1730. Exemplary display interfaces 1702 may include high-definition multimedia interface (HDMI), digital visual interface (DVI), video graphics array (VGA), etc. The display 1730 may be any suitable type of display for displaying data transmitted via the display interface 1702 of the computer system 1700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1708 and secondary memory 1710, which may be memory semiconductors (e.g., DRAMs, etc.). These computer program products may be means for providing software to the computer system 1700. Computer programs (e.g., computer control logic) may be stored in the main memory 1708 and/or the secondary memory 1710. Computer programs may also be received via the communications interface 1724. Such computer programs, when executed, may enable computer system 1700 to implement the present methods as discussed herein. In particular, the computer programs, when executed, may enable processor device 1704 to implement the methods illustrated by FIGS. 7, 8, 9A, 9B, 10A, 10B, 11, and 13-16, as discussed herein. Accordingly, such computer programs may represent controllers of the computer system 1700. Where the present disclosure is implemented using software, the software may be stored in a computer program product and loaded into the computer system 1700 using the removable storage drive 1714, interface 1720, and hard disk drive 1712, or communications interface 1724.

Techniques consistent with the present disclosure provide, among other features, systems and methods for processing payment transactions using a mobile device without using a secure element, including the transmission and validation of remote notification service messages and secure storage of data using an advanced storage key. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for building an advanced storage key, comprising:
    generating, by a processing device of a mobile communication device, a device fingerprint associated with the mobile communication device based on stored device information via a first application program on the mobile communication device;
    generating, by the processing device via the first application program, a random value;
    generating, by the processing device via the first application program, a diversifier value based on at least the generated device fingerprint, the generated random value, and an instance identifier included in the first application program, the instance identifier being unique to an instance of the first application program;
    building, by the processing device via the first application program, the advanced storage key by encrypting the diversifier value using a first key included in a second application program, the advanced storage key being unique to the instance of the first application program;
    storing, by the processing device via the first application program, data in a local database of the mobile communication device; and
    encrypting, by the processing device via the second application program, the data stored in the local database using the advanced storage key such that the data is only accessible by the instance of the first application program.

2. The method of claim 1, wherein the device information includes one or more unique identifiers associated with the mobile communication device.

3. The method of claim 1, wherein the random value is a random or pseudo-random number.

4. The method of claim 1, wherein the diversifier value is encrypted via white box cryptography using the first key.

5. The method of claim 1, wherein the first key is a dynamic key.

6. The method of claim 1, wherein the second application program is included in the first application program.

7. The method of claim 6, wherein the second application program set is an executable function of the first application program.

8. The method of claim 1, further comprising:
    transmitting, by a transmitting device, at least the generated random value;
    receiving, by a receiving device, one or more encrypted parameters, wherein the one or more encrypted parameters are each encrypted using the advanced storage key; and
    storing, in a local database of the mobile communication device, the received one or more encrypted parameters.

9. The method of claim 8, wherein transmitting at least the generated random value further includes transmitting the instance identifier.

10. The method of claim 1, wherein the first application program is a mobile payment application and the second application program is a cryptography application.

11. A non-transitory computer readable recording medium configured to store a program causing a processing device of a mobile communication device to execute a method for building an advanced storage key, the method comprising:
    generating, by a processing device of a mobile communication device, a device fingerprint associated with the mobile communication device based on stored device information via a first application program on the mobile communication device;
    generating, by the processing device via the first application program, a random value;
    generating, by the processing device via the first application program, a diversifier value based on at least the generated device fingerprint, the generated random value, and an instance identifier included in the first application program, the instance identifier being unique to an instance of the first application program;
    building, by the processing device via the first application program, the advanced storage key by encrypting the diversifier value using a first key included in a second application program, the advanced storage key being unique to the instance of the first application program;
    storing, by the processing device via the first application program, data in a local database of the mobile communication device; and
    encrypting, by the processing device via the second application program, the data stored in the local database using the advanced storage key such that the data is only accessible by the instance of the first application program.

12. The non-transitory computer readable recording medium of claim 11, wherein the device information includes one or more unique identifiers associated with the mobile communication device.

13. The non-transitory computer readable recording medium of claim 11, wherein the random value is a random or pseudo-random number.

14. The non-transitory computer readable recording medium of claim 11, wherein the diversifier value is encrypted via white box cryptography using the first key.

15. The non-transitory computer readable recording medium of claim 11, wherein the first key is a dynamic key.

16. The non-transitory computer readable recording medium of claim 11, wherein the second application program set of processor readable instructions is included in the first application program set of processor readable instructions.

17. The non-transitory computer readable recording medium of claim 16, wherein the second application program set of processor readable instructions is an executable function of the first application program set of processor readable instructions.

18. The non-transitory computer readable recording medium of claim 11, the method further comprising:
    transmitting, by a transmitting device, the generated random value;
    receiving, by a receiving device, one or more encrypted parameters, wherein the one or more encrypted parameters are each encrypted using the advanced storage key; and
    storing, in a local database of the mobile communication device, the received one or more encrypted parameters.

19. The non-transitory computer readable recording medium of claim 18, wherein transmitting the generated random value further includes transmitting the instance identifier.

20. The non-transitory computer readable recording medium of claim 11, wherein the first application program is a mobile payment application and the second application program is a cryptography application.

* * * * *